(12) United States Patent
Foster

(10) Patent No.: US 8,612,319 B2
(45) Date of Patent: Dec. 17, 2013

(54) SYSTEM AND METHOD FOR REAL-TIME PRICING WITH VOLUME DISCOUNTING

(75) Inventor: Robert A. Foster, Brighton (AU)

(73) Assignee: Financial Systems Technology (Intellectual Property) Pty Ltd, Malvern (AU)

(*) Notice: Subject to any disclaimer, the term of this patent is extended or adjusted under 35 U.S.C. 154(b) by 89 days.

(21) Appl. No.: 13/308,278

(22) Filed: Nov. 30, 2011

(65) Prior Publication Data

US 2012/0101924 A1 Apr. 26, 2012

Related U.S. Application Data

(63) Continuation of application No. 12/556,476, filed on Sep. 9, 2009, now Pat. No. 8,090,634, which is a continuation of application No. 09/785,783, filed on Feb. 16, 2001, now Pat. No. 7,606,744.

(51) Int. Cl.
*G06F 19/00* (2011.01)

(52) U.S. Cl.
USPC .............................................. 705/34; 705/40

(58) Field of Classification Search
USPC ....................................................... 705/30, 34
See application file for complete search history.

(56) References Cited

U.S. PATENT DOCUMENTS

| | | |
|---|---|---|
| 4,855,908 A | 8/1989 | Shimoda et al. |
| 5,550,734 A | 8/1996 | Tarter et al. |
| 5,559,313 A | 9/1996 | Claus et al. |
| 5,590,197 A | 12/1996 | Chen et al. |
| 5,604,899 A | 2/1997 | Doktor |
| 5,613,012 A | 3/1997 | Hoffman et al. |
| 5,617,567 A | 4/1997 | Doktor |
| 5,630,127 A | 5/1997 | Moore et al. |
| 5,636,117 A | 6/1997 | Rothstein |
| 5,652,882 A | 7/1997 | Doktor |
| 5,675,779 A | 10/1997 | Doktor |
| 5,682,482 A | 10/1997 | Burt et al. |
| 5,704,044 A | 12/1997 | Tarter et al. |
| 5,706,442 A | 1/1998 | Anderson et al. |
| 5,710,887 A | 1/1998 | Chelleah et al. |
| 5,742,775 A | 4/1998 | King |
| 5,747,784 A | 5/1998 | Walter et al. |
| 5,757,917 A | 5/1998 | Rose et al. |
| 5,826,259 A | 10/1998 | Doktor |
| 5,838,812 A | 11/1998 | Pare, Jr. et al. |
| 5,852,812 A | 12/1998 | Reeder |

(Continued)

OTHER PUBLICATIONS

Howcroft. "Contemporary issues in UK bank delivery systems," Inter. Jour. of Service Industry Management, vol. 3, No. 1, pp. 39-55, ISBN 0956-4233, 1992.

(Continued)

*Primary Examiner* — Elaine Gort
(74) *Attorney, Agent, or Firm* — Edward C. Kwok; Hogan Lovells US LLP

(57) ABSTRACT

A system and method are provided for facilitating real-time pricing with volume discounting. The method includes receiving a request for a real-time price quote for a transaction from a first account. The request is received at a first instance in time during a billing cycle. The method also includes determining a first production service, where the first production service is a component of the transaction, and determining a count of first production service instances representing the first production service in the received transaction. The method further includes determining a billable entity for the transaction, where the billable entity includes one or more related accounts, and the related accounts includes the first account.

22 Claims, 2 Drawing Sheets

(56) References Cited

U.S. PATENT DOCUMENTS

| | | |
|---|---|---|
| 5,878,400 A | 3/1999 | Carter |
| 6,047,274 A | 4/2000 | Johnson et al. |
| 6,049,782 A | 4/2000 | Gottesman et al. |
| 6,052,672 A | 4/2000 | Foster |
| 6,101,484 A | 8/2000 | Halbert et al. |
| 6,167,378 A | 12/2000 | Webber, Jr. |
| 6,182,054 B1 | 1/2001 | Dickinson et al. |
| 6,324,522 B2 | 11/2001 | Peterson et al. |
| 6,341,271 B1 | 1/2002 | Salvo et al. |
| 6,584,451 B1 | 6/2003 | Shoham et al. |
| 6,598,029 B1 | 7/2003 | Johnson et al. |
| 6,631,356 B1 | 10/2003 | Van Horn et al. |
| 6,928,416 B1 | 8/2005 | Bertash |
| 7,593,896 B1 | 9/2009 | Flitcroft et al. |
| 7,827,064 B1 | 11/2010 | Foster |
| 2002/0026394 A1 | 2/2002 | Savage et al. |

OTHER PUBLICATIONS

"Teller fees translate to torrid ATM activity", Debit Card News, vol. 1, No. 4, p. 1+, Jun. 3, 1995.

"The Smart Card's Chief Advocate", Credit Card Management, vol. 10, No. 1, p. 26+, ISBN: 0896-9329, 1992.

"Bank Freeze Debit Fees To Shorten Teller Lines". Debit Card News, vol. 1, No. 1, p. 1+, Jun. 15, 1995.

White, Ron, How Computers Work, Millineum Ed. Que Corporation, Sep. 1999.

Derfler, Frank J. et al., How Networks Work, Millennium Ed., Que Corporation, Jan. 2000.

Gralla, Preston, How the Internet Works, Millennium Ed., Que Corporation, Aug. 1999.

Borland's Paradox for Windows User's Guide, Borland International, Inc, 1994.

Muller, Nathan J., Desktop Encyclopedia of the Internet, Artech House, Inc., 1998.

Hirschey, Mark, and Pappas, James L.; Managerial Economics, $8^{th}$ Ed., The Dryden Press, Fort Worth, TX, 1996.

Dobler, Donald W. and Burt, David N., Purchasing and Supply Management, Text & Cases, $6^{th}$ Ed., The McGraw-Hill Companies, Inc., 1996.

Brigham, Eugene F. & Gapenski, Louis C., Financial Management, Theory & Practice, $7^{th}$ Ed., The Dryden Press, Harcourt Brace & Co., 1994.

Hendler, James A., Expert Systems: The User Interface, Albex Publishing Corporation, Norwood, NJ 1988, pp. 31, 46-47, 109-110, 113 and 132-134.

Belzer, B. Software Testing Techniques, 2nd Edition, International Thompson Computer Press, 1990, p.1.

Carrubba, P., Principles of Banking, American Bankers Association, 1994, pp. 170-172.

Parsaye, Kamran & Chignell, Mark, Expert Systems for Experts, John Wiley & Sons, 1988, pp. 35-60, 177-178, 191-210 and 295-309.

SYSTEM AND METHOD FOR REAL-TIME PRICING WITH VOLUME DISCOUNTING

CROSS REFERENCE TO RELATED APPLICATIONS

The present application is a continuation of U.S. patent application Ser. No. 12/556,476 filed on Sep. 9, 2009, which is a continuation of U.S. patent application Ser. No. 09/785,783 filed on Feb. 16, 2001, now issued as U.S. Pat. No. 7,606,744. The disclosures of all related applications are incorporated herein by reference, as if fully stated here, for all purposes.

RELATED PATENTS

The present application is related to the commonly owned U.S. Pat. No. 6,052,672 entitled "DATA PROCESSING SYSTEM FOR COMPLEX PRICING AND TRANSACTIONAL ANALYSIS," which is hereby incorporated by reference herein in its entirety.

RELATED APPLICATIONS

The present application is related to the co-pending and commonly owned U.S. patent application Ser. No. 09/183,335 entitled "DATA PROCESSING SYSTEM FOR PRICING, COSTING AND BILLING OF FINANCIAL TRANSACTIONS," which is hereby incorporated by reference herein in its entirety.

COMPUTER PROGRAM LISTING APPENDIX

The computer program listing appendix attached hereto consists of two (2) identical compact disks, copy 1 and copy 2, each containing a listing of the software code for embodiments of components of this invention. Each compact disk contains the following files (date and time of creation, size in bytes, filename):

```
                    Directory of D:\

02/01/01 09:33a    <DIR>     .
02/01/01 09:33a    <DIR>     ..
01/31/01 03:31p    <DIR>     M-9381 US
                    Directory of D:\M-9381 US 01/31/01 03:31p    <DIR>     .
02/01/01 09:33a    <DIR>     ..
01/31/01 03:24p    <DIR>     CIS
01/31/01 03:27p    <DIR>     COR
01/31/01 03:27p    <DIR>     LIB
01/31/01 03:27p    <DIR>     LXN
01/31/01 03:28p    <DIR>     MFS
01/31/01 03:30p    <DIR>     MSC
01/31/01 03:30p    <DIR>     SCRIPTS
01/31/01 03:31p    <DIR>     SQL
01/31/01 03:35p    <DIR>     WEBAPP
                    Directory of D:\M-9381 US\CIS 01/31/01 03:24p    <DIR>     .
01/31/01 03:31p    <DIR>     ..
01/29/01 12:28p          35,689 BCIS401_CBL.TXT
01/29/01 12:29p          51,724 BCIS411_CBL.TXT
01/29/01 12:29p          13,593 BCIS422_CBL.TXT
01/29/01 10:38a          48,235 ICIS100_CBL.TXT
01/29/01 10:50a          32,018 ICIS100_CPY.TXT
01/29/01 10:38a          44,419 ICIS101_CBL.TXT
01/29/01 10:50a          31,518 ICIS101_CPY.TXT
01/29/01 10:38a          42,227 ICIS102_CBL.TXT
01/29/01 10:51a          25,203 ICIS102_CPY.TXT
01/29/01 10:38a          51,159 ICIS103_CBL.TXT
01/29/01 10:51a          38,667 ICIS103_CPY.TXT
01/29/01 10:38a          46,375 ICIS104_CBL.TXT
01/29/01 10:51a          35,859 ICIS104_CPY.TXT
01/29/01 10:38a          51,279 ICIS106_CBL.TXT
01/29/01 10:51a          38,280 ICIS106_CPY.TXT
01/29/01 10:38a          39,990 ICIS111_CBL.TXT
01/29/01 10:51a          25,475 ICIS111_CPY.TXT
01/29/01 10:38a          32,573 ICIS112_CBL.TXT
01/29/01 10:51a          16,025 ICIS112_CPY.TXT
01/29/01 10:38a          40,689 ICIS140_CBL.TXT
01/29/01 10:51a          24,440 ICIS140_CPY.TXT
01/29/01 10:38a          31,169 ICIS141_CBL.TXT
01/29/01 10:51a          16,346 ICIS141_CPY.TXT
01/29/01 10:38a          67,112 ICIS142_CBL.TXT
01/29/01 10:51a          47,991 ICIS142_CPY.TXT
01/29/01 10:38a          43,061 ICIS143_CBL.TXT
01/29/01 10:51a          30,175 ICIS143_CPY.TXT
01/29/01 10:38a          52,646 ICIS190_CBL.TXT
01/29/01 10:51a          35,127 ICIS190_CPY.TXT
01/29/01 10:38a          54,168 ICIS191_CBL.TXT
01/29/01 10:51a          36,971 ICIS191_CPY.TXT
01/29/01 10:38a          69,765 ICIS192_CBL.TXT
01/29/01 10:51a          50,485 ICIS192_CPY.TXT
```

-continued

| | | |
|---|---|---|
| 01/29/01 10:38a | 67,750 | ICIS193_CBL.TXT |
| 01/29/01 10:51a | 49,658 | ICIS193_CPY.TXT |
| 01/29/01 10:38a | 52,048 | ICIS194_CBL.TXT |
| 01/29/01 10:51a | 35,084 | ICIS194_CPY.TXT |
| 01/29/01 10:39a | 72,666 | ICIS196_CBL.TXT |
| 01/29/01 10:51a | 52,178 | ICIS196_CPY.TXT |
| 01/29/01 10:39a | 62,728 | ICIS199_CBL.TXT |
| 01/29/01 10:51a | 45,142 | ICIS199_CPY.TXT |
| 01/29/01 10:39a | 51,443 | ICIS701_CBL.TXT |
| 01/29/01 10:51a | 38,177 | ICIS701_CPY.TXT |
| 01/29/01 10:39a | 72,098 | ICIS702_CBL.TXT |
| 01/29/01 10:51a | 52,566 | ICIS702_CPY.TXT |
| 01/29/01 10:39a | 46,680 | ICIS703_CBL.TXT |
| 01/29/01 10:51a | 33,441 | ICIS703_CPY.TXT |
| 01/29/01 10:39a | 68,603 | ICIS704_CBL.TXT |
| 01/29/01 10:51a | 48,149 | ICIS704_CPY.TXT |
| 01/29/01 10:39a | 49,424 | ICIS705_CBL.TXT |
| 01/29/01 10:51a | 38,919 | ICIS705_CPY.TXT |
| 01/29/01 10:39a | 58,596 | ICIS706_CBL.TXT |
| 01/29/01 10:51a | 41,118 | ICIS706_CPY.TXT |
| 01/29/01 10:39a | 49,731 | ICIS707_CBL.TXT |
| 01/29/01 10:51a | 38,992 | ICIS707_CPY.TXT |
| 01/29/01 10:39a | 62,834 | ICIS708_CBL.TXT |
| 01/29/01 10:51a | 44,418 | ICIS708_CPY.TXT |
| 01/29/01 10:39a | 45,267 | ICIS709_CBL.TXT |
| 01/29/01 10:52a | 27,989 | ICIS709_CPY.TXT |
| 01/29/01 10:39a | 70,396 | ICIS710_CBL.TXT |
| 01/29/01 10:52a | 50,847 | ICIS710_CPY.TXT |
| 01/29/01 10:39a | 50,533 | ICIS711_CBL.TXT |
| 01/29/01 10:52a | 39,666 | ICIS711_CPY.TXT |
| 01/29/01 10:39a | 66,244 | ICIS712_CBL.TXT |
| 01/29/01 10:52a | 47,318 | ICIS712_CPY.TXT |
| 01/29/01 10:39a | 43,092 | ICIS713_CBL.TXT |
| 01/29/01 10:52a | 26,459 | ICIS713_CPY.TXT |
| 01/29/01 10:39a | 73,837 | ICIS714_CBL.TXT |
| 01/29/01 10:52a | 53,861 | ICIS714_CPY.TXT |
| 01/29/01 10:39a | 37,260 | ICIS717_CBL.TXT |
| 01/29/01 10:52a | 20,949 | ICIS717_CPY.TXT |
| 01/29/01 10:39a | 72,726 | ICIS718_CBL.TXT |
| 01/29/01 10:52a | 53,256 | ICIS718_CPY.TXT |
| 01/29/01 10:39a | 70,867 | ICIS723_CBL.TXT |
| 01/29/01 10:52a | 58,288 | ICIS723_CPY.TXT |
| 01/29/01 10:39a | 76,278 | ICIS724_CBL.TXT |
| 01/29/01 10:52a | 55,563 | ICIS724_CPY.TXT |
| 01/29/01 10:39a | 52,323 | ICIS727_CBL.TXT |
| 01/29/01 10:52a | 40,879 | ICIS727_CPY.TXT |
| 01/29/01 10:39a | 72,519 | ICIS728_CBL.TXT |
| 01/29/01 10:52a | 51,904 | ICIS728_CPY.TXT |
| 01/29/01 10:39a | 69,747 | ICIS729_CBL.TXT |
| 01/29/01 10:52a | 56,052 | ICIS729_CPY.TXT |
| 01/29/01 10:39a | 73,137 | ICIS730_CBL.TXT |
| 01/29/01 10:52a | 52,659 | ICIS730_CPY.TXT |
| 01/29/01 10:39a | 50,833 | ICIS731_CBL.TXT |
| 01/29/01 10:52a | 39,710 | ICIS731_CPY.TXT |
| 01/29/01 10:39a | 65,788 | ICIS732_CBL.TXT |
| 01/29/01 10:52a | 46,050 | ICIS732_CPY.TXT |
| 01/29/01 10:39a | 64,002 | ICIS999_CBL.TXT |
| 01/29/01 10:52a | 45,683 | ICIS999_CPY.TXT |
| 01/29/01 12:32p | 46,994 | LCIS401_CBL.TXT |
| 01/29/01 12:32p | 27,233 | LCIS402_CBL.TXT |
| 01/29/01 12:32p | 24,540 | LCIS403_CBL.TXT |
| 01/29/01 12:32p | 23,580 | LCIS404_CBL.TXT |
| 01/29/01 12:32p | 23,940 | LCIS405_CBL.TXT |
| 01/29/01 12:32p | 28,032 | LCIS406_CBL.TXT |
| 01/29/01 12:32p | 22,800 | LCIS407_CBL.TXT |
| 01/29/01 12:33p | 21,556 | LCIS408_CBL.TXT |
| 01/29/01 12:33p | 33,308 | LCIS409_CBL.TXT |
| 01/29/01 12:33p | 31,048 | LCIS411_CBL.TXT |
| 01/29/01 12:33p | 21,525 | LCIS428_CBL.TXT |
| 01/29/01 12:33p | 21,497 | LCIS429_CBL.TXT |
| 01/29/01 12:33p | 34,823 | LCIS430_CBL.TXT |
| 01/29/01 12:33p | 32,605 | LCIS431_CBL.TXT |
| 01/29/01 12:33p | 27,771 | LCIS432_CBL.TXT |
| 01/29/01 12:33p | 29,055 | LCIS433_CBL.TXT |
| 01/29/01 12:34p | 27,890 | LCIS434_CBL.TXT |
| 01/29/01 12:34p | 23,259 | LCIS440_CBL.TXT |
| 01/29/01 12:34p | 22,995 | LCIS441_CBL.TXT |
| 01/29/01 12:34p | 23,029 | LCIS442_CBL.TXT |
| 01/29/01 12:34p | 23,025 | LCIS443_CBL.TXT |
| 01/29/01 12:34p | 22,786 | LCIS444_CBL.TXT |

-continued

| | | |
|---|---|---|
| 01/29/01 12:34p | 27,668 | LCIS445__CBL.TXT |
| 01/29/01 12:34p | 29,873 | LCIS449__CBL.TXT |
| 01/29/01 12:34p | 76,689 | LCIS451__CBL.TXT |
| 01/29/01 10:46a | 317 | LCIS451__CPY.TXT |
| 01/29/01 12:34p | 55,568 | LCIS452__CBL.TXT |
| 01/29/01 10:46a | 317 | LCIS452__CPY.TXT |
| 01/29/01 12:35p | 54,293 | LCIS455__CBL.TXT |
| 01/29/01 10:46a | 317 | LCIS455__CPY.TXT |
| 01/29/01 12:35p | 66,733 | LCIS460__CBL.TXT |
| 01/29/01 12:35p | 37,261 | LCIS462__CBL.TXT |
| 01/29/01 12:35p | 99,936 | LCIS463__CBL.TXT |
| 01/29/01 04:01p | 104,294 | RCIS100m.TXT |
| 01/29/01 04:02p | 84,216 | RCIS101m.TXT |
| 01/29/01 04:02p | 87,439 | RCIS102m.TXT |
| 01/29/01 04:26p | 92,074 | RCIS103m.TXT |
| 01/29/01 04:26p | 83,317 | RCIS104m.TXT |
| 01/29/01 04:26p | 92,933 | RCIS106m.TXT |
| 01/29/01 04:26p | 83,164 | RCIS111m.TXT |
| 01/29/01 04:34p | 61,274 | RCIS112m.TXT |
| 01/29/01 04:26p | 89,756 | RCIS140m.TXT |
| 01/29/01 04:26p | 70,581 | RCIS141m.TXT |
| 01/29/01 04:26p | 112,220 | RCIS142m.TXT |
| 01/29/01 04:27p | 69,415 | RCIS143m.TXT |
| 01/29/01 04:34p | 85,294 | RCIS190m.TXT |
| 01/29/01 04:34p | 87,768 | RCIS191m.TXT |
| 01/29/01 04:34p | 102,190 | RCIS192m.TXT |
| 01/29/01 04:34p | 105,248 | RCIS193m.TXT |
| 01/29/01 04:34p | 85,497 | RCIS194m.TXT |
| 01/29/01 04:34p | 107,615 | RCIS196m.TXT |
| 01/29/01 04:34p | 99,720 | RCIS199m.TXT |
| 01/29/01 04:28p | 99,722 | RCIS701m.TXT |
| 01/29/01 04:34p | 115,070 | RCIS702m.TXT |
| 01/29/01 04:29p | 85,799 | RCIS703m.TXT |
| 01/29/01 04:34p | 104,168 | RCIS704m.TXT |
| 01/29/01 04:29p | 85,717 | RCIS705m.TXT |
| 01/29/01 04:34p | 93,370 | RCIS706m.TXT |
| 01/29/01 04:29p | 88,711 | RCIS707m.TXT |
| 01/29/01 04:34p | 101,296 | RCIS708m.TXT |
| 01/29/01 04:29p | 97,929 | RCIS709m.TXT |
| 01/29/01 04:34p | 108,786 | RCIS710m.TXT |
| 01/29/01 04:29p | 91,554 | RCIS711m.TXT |
| 01/29/01 04:34p | 107,841 | RCIS712m.TXT |
| 01/29/01 04:29p | 95,314 | RCIS713m.TXT |
| 01/29/01 04:34p | 116,846 | RCIS714m.TXT |
| 01/29/01 04:29p | 82,667 | RCIS717m.TXT |
| 01/29/01 04:34p | 105,771 | RCIS718m.TXT |
| 01/29/01 04:31p | 125,556 | RCIS723m.TXT |
| 01/29/01 04:34p | 118,032 | RCIS724m.TXT |
| 01/29/01 04:31p | 86,801 | RCIS727m.TXT |
| 01/29/01 04:34p | 111,967 | RCIS728m.TXT |
| 01/29/01 04:31p | 117,336 | RCIS729m.TXT |
| 01/29/01 04:34p | 109,443 | RCIS730m.TXT |
| 01/29/01 04:30p | 86,482 | RCIS731m.TXT |
| 01/29/01 04:34p | 105,040 | RCIS732m.TXT |
| 01/29/01 04:34p | 97,329 | RCIS999m.TXT |
| 01/29/01 10:39a | 144,095 | SCIS100__CBL.TXT |
| 01/29/01 10:53a | 343 | SCIS100__CPY.TXT |
| 01/29/01 10:39a | 91,151 | SCIS101__CBL.TXT |
| 01/29/01 10:54a | 343 | SCIS101__CPY.TXT |
| 01/29/01 10:39a | 90,179 | SCIS102__CBL.TXT |
| 01/29/01 10:54a | 349 | SCIS102__CPY.TXT |
| 01/29/01 10:39a | 124,449 | SCIS103__CBL.TXT |
| 01/29/01 10:54a | 349 | SCIS103__CPY.TXT |
| 01/29/01 10:39a | 84,119 | SCIS104__CBL.TXT |
| 01/29/01 10:54a | 340 | SCIS104__CPY.TXT |
| 01/29/01 10:39a | 140,052 | SCIS106__CBL.TXT |
| 01/29/01 10:54a | 346 | SCIS106__CPY.TXT |
| 01/29/01 10:39a | 84,012 | SCIS111__CBL.TXT |
| 01/29/01 10:54a | 337 | SCIS111__CPY.TXT |
| 01/29/01 12:35p | 92,662 | SCIS112__CBL.TXT |
| 01/29/01 10:39a | 101,417 | SCIS140__CBL.TXT |
| 01/29/01 10:54a | 343 | SCIS140__CPY.TXT |
| 01/29/01 10:39a | 74,035 | SCIS141__CBL.TXT |
| 01/29/01 10:39a | 299,844 | SCIS142__CBL.TXT |
| 01/29/01 10:54a | 346 | SCIS142__CPY.TXT |
| 01/29/01 12:41p | 87,824 | SCIS143__CBL.TXT |
| 01/29/01 10:39a | 118,965 | SCIS190__CBL.TXT |
| 01/29/01 10:39a | 126,028 | SCIS191__CBL.TXT |
| 01/29/01 10:39a | 140,902 | SCIS192__CBL.TXT |
| 01/29/01 10:39a | 136,390 | SCIS193__CBL.TXT |

-continued

| | | |
|---|---|---|
| 01/29/01 10:39a | 118,178 | SCIS194__CBL.TXT |
| 01/29/01 10:39a | 146,211 | SCIS196__CBL.TXT |
| 01/29/01 10:39a | 124,426 | SCIS199__CBL.TXT |
| 01/29/01 10:39a | 169,468 | SCIS701__CBL.TXT |
| 01/29/01 10:55a | 346 | SCIS701__CPY.TXT |
| 01/29/01 10:39a | 139,090 | SCIS702__CBL.TXT |
| 01/29/01 10:40a | 88,998 | SCIS703__CBL.TXT |
| 01/29/01 10:55a | 346 | SCIS703__CPY.TXT |
| 01/29/01 10:40a | 134,605 | SCIS704__CBL.TXT |
| 01/29/01 10:40a | 104,320 | SCIS705__CBL.TXT |
| 01/29/01 10:55a | 349 | SCIS705__CPY.TXT |
| 01/29/01 10:40a | 124,457 | SCIS706__CBL.TXT |
| 01/29/01 10:40a | 91,408 | SCIS707__CBL.TXT |
| 01/29/01 10:55a | 349 | SCIS707__CPY.TXT |
| 01/29/01 10:40a | 125,202 | SCIS708__CBL.TXT |
| 01/29/01 10:40a | 116,165 | SCIS709__CBL.TXT |
| 01/29/01 10:55a | 343 | SCIS709__CPY.TXT |
| 01/29/01 10:40a | 148,219 | SCIS710__CBL.TXT |
| 01/29/01 10:40a | 93,778 | SCIS711__CBL.TXT |
| 01/29/01 10:55a | 346 | SCIS711__CPY.TXT |
| 01/29/01 10:40a | 126,338 | SCIS712__CBL.TXT |
| 01/29/01 10:40a | 214,783 | SCIS713__CBL.TXT |
| 01/29/01 10:55a | 675 | SCIS713__CPY.TXT |
| 01/29/01 10:40a | 136,369 | SCIS714__CBL.TXT |
| 01/29/01 10:40a | 84,799 | SCIS717__CBL.TXT |
| 01/29/01 10:56a | 349 | SCIS717__CPY.TXT |
| 01/29/01 10:40a | 127,780 | SCIS718__CBL.TXT |
| 01/29/01 10:40a | 468,380 | SCIS723__CBL.TXT |
| 01/29/01 10:56a | 349 | SCIS723__CPY.TXT |
| 01/29/01 10:40a | 186,159 | SCIS724__CBL.TXT |
| 01/29/01 10:40a | 238,079 | SCIS727__CBL.TXT |
| 01/29/01 10:56a | 349 | SCIS727__CPY.TXT |
| 01/29/01 10:40a | 128,803 | SCIS728__CBL.TXT |
| 01/29/01 10:40a | 436,585 | SCIS729__CBL.TXT |
| 01/29/01 10:56a | 346 | SCIS729__CPY.TXT |
| 01/29/01 10:40a | 175,547 | SCIS730__CBL.TXT |
| 01/29/01 10:40a | 86,311 | SCIS731__CBL.TXT |
| 01/29/01 10:57a | 349 | SCIS731__CPY.TXT |
| 01/29/01 10:40a | 127,420 | SCIS732__CBL.TXT |
| 01/29/01 10:40a | 144,640 | SCIS999__CBL.TXT |
| | Directory of D:\M-9381 US\COR | |
| 01/31/01 03:27p | <DIR> | . |
| 01/31/01 03:31p | <DIR> | .. |
| 01/29/01 10:41a | 16,105 | BCOR001__CBL.TXT |
| 01/29/01 10:41a | 16,691 | BCOR002__CBL.TXT |
| 01/29/01 12:29p | 68,108 | BCOR003__CBL.TXT |
| 01/29/01 10:39a | 25,942 | ICOR001__CBL.TXT |
| 01/29/01 10:52a | 8,372 | ICOR001__CPY.TXT |
| 01/29/01 10:39a | 43,927 | ICOR011__CBL.TXT |
| 01/29/01 10:52a | 26,969 | ICOR011__CPY.TXT |
| 01/29/01 10:39a | 38,679 | ICOR012__CBL.TXT |
| 01/29/01 10:52a | 22,122 | ICOR012__CPY.TXT |
| 01/29/01 10:39a | 40,805 | ICOR013__CBL.TXT |
| 01/29/01 10:52a | 24,879 | ICOR013__CPY.TXT |
| 01/29/01 10:39a | 41,479 | ICOR016__CBL.TXT |
| 01/29/01 10:52a | 28,351 | ICOR016__CPY.TXT |
| 01/29/01 10:39a | 41,295 | ICOR017__CBL.TXT |
| 01/29/01 10:52a | 27,875 | ICOR017__CPY.TXT |
| 01/29/01 10:39a | 47,559 | ICOR019__CBL.TXT |
| 01/29/01 10:53a | 29,279 | ICOR019__CPY.TXT |
| 01/29/01 10:39a | 41,090 | ICOR020__CBL.TXT |
| 01/29/01 10:53a | 27,139 | ICOR020__CPY.TXT |
| 01/29/01 10:39a | 42,011 | ICOR021__CBL.TXT |
| 01/29/01 10:53a | 29,334 | ICOR021__CPY.TXT |
| 01/29/01 12:35p | 30,078 | ICOR022__CBL.TXT |
| 01/29/01 10:53a | 8,651 | ICOR022__CPY.TXT |
| 01/29/01 10:39a | 37,393 | ICOR023__CBL.TXT |
| 01/29/01 10:53a | 21,514 | ICOR023__CPY.TXT |
| 01/29/01 10:39a | 64,580 | ICOR025__CBL.TXT |
| 01/29/01 10:53a | 46,243 | ICOR025__CPY.TXT |
| 01/29/01 10:39a | 42,068 | ICOR028__CBL.TXT |
| 01/29/01 10:53a | 29,929 | ICOR028__CPY.TXT |
| 01/29/01 10:39a | 56,659 | ICOR050__CBL.TXT |
| 01/29/01 10:53a | 38,833 | ICOR050__CPY.TXT |
| 01/29/01 10:39a | 54,144 | ICOR051__CBL.TXT |
| 01/29/01 10:53a | 36,342 | ICOR051__CPY.TXT |
| 01/29/01 10:39a | 49,390 | ICOR052__CBL.TXT |
| 01/29/01 10:53a | 32,346 | ICOR052__CPY.TXT |
| 01/29/01 10:39a | 61,073 | ICOR053__CBL.TXT |

-continued

| | | |
|---|---|---|
| 01/29/01 10:53a | 42,464 | ICOR053__CPY.TXT |
| 01/29/01 10:39a | 49,137 | ICOR054__CBL.TXT |
| 01/29/01 10:53a | 32,156 | ICOR054__CPY.TXT |
| 01/29/01 10:39a | 57,354 | ICOR055__CBL.TXT |
| 01/29/01 10:53a | 39,006 | ICOR055__CPY.TXT |
| 01/29/01 10:39a | 70,700 | ICOR056__CBL.TXT |
| 01/29/01 10:53a | 50,684 | ICOR056__CPY.TXT |
| 01/29/01 10:39a | 49,283 | ICOR057__CBL.TXT |
| 01/29/01 10:53a | 32,345 | ICOR057__CPY.TXT |
| 01/29/01 10:39a | 67,585 | ICOR058__CBL.TXT |
| 01/29/01 10:53a | 48,403 | ICOR058__CPY.TXT |
| 01/29/01 10:39a | 68,072 | ICOR059__CBL.TXT |
| 01/29/01 10:53a | 47,277 | ICOR059__CPY.TXT |
| 01/29/01 12:41p | 79,984 | LCOR001__CBL.TXT |
| 01/29/01 10:46a | 323 | LCOR001__CPY.TXT |
| 01/29/01 12:35p | 27,847 | LCOR002__CBL.TXT |
| 01/29/01 12:36p | 29,319 | LCOR003__CBL.TXT |
| 01/29/01 12:36p | 33,886 | LCOR004__CBL.TXT |
| 01/29/01 12:36p | 28,433 | LCOR005__CBL.TXT |
| 01/29/01 01:35p | 26,328 | LCOR006__CBL.TXT |
| 01/29/01 12:36p | 23,979 | LCOR007__CBL.TXT |
| 01/29/01 12:42p | 27,505 | LCOR010__CBL.TXT |
| 01/29/01 04:30p | 57,676 | RCOR000m.TXT |
| 01/29/01 04:30p | 53,152 | RCOR001m.TXT |
| 01/29/01 04:34p | 57,916 | RCOR002m.TXT |
| 01/29/01 04:34p | 53,337 | RCOR007m.TXT |
| 01/29/01 04:30p | 92,054 | RCOR011m.TXT |
| 01/29/01 04:30p | 86,881 | RCOR012m.TXT |
| 01/29/01 04:30p | 86,596 | RCOR013m.TXT |
| 01/29/01 04:30p | 82,400 | RCOR016m.TXT |
| 01/29/01 04:30p | 83,438 | RCOR017m.TXT |
| 01/29/01 04:30p | 59,213 | RCOR018m.TXT |
| 01/29/01 04:30p | 100,528 | RCOR019m.TXT |
| 01/29/01 04:30p | 84,268 | RCOR020m.TXT |
| 01/29/01 04:30p | 81,747 | RCOR021m.TXT |
| 01/29/01 04:30p | 81,903 | RCOR023m.TXT |
| 01/29/01 04:35p | 98,146 | RCOR025m.TXT |
| 01/29/01 04:30p | 81,155 | RCOR028m.TXT |
| 01/29/01 04:30p | 46,097 | RCOR033m.TXT |
| 01/29/01 04:35p | 91,065 | RCOR050m.TXT |
| 01/29/01 04:35p | 87,584 | RCOR051m.TXT |
| 01/29/01 04:35p | 80,488 | RCOR052m.TXT |
| 01/29/01 04:35p | 96,711 | RCOR053m.TXT |
| 01/29/01 04:35p | 81,410 | RCOR054m.TXT |
| 01/29/01 04:35p | 92,375 | RCOR055m.TXT |
| 01/29/01 04:35p | 102,448 | RCOR056m.TXT |
| 01/29/01 04:35p | 81,376 | RCOR057m.TXT |
| 01/29/01 04:35p | 104,131 | RCOR058m.TXT |
| 01/29/01 04:35p | 104,784 | RCOR059m.TXT |
| 01/29/01 12:42p | 93,661 | SCOR000__CBL.TXT |
| 01/29/01 10:57a | 348 | SCOR000__CPY.TXT |
| 01/29/01 12:36p | 86,049 | SCOR001__CBL.TXT |
| 01/29/01 10:57a | 348 | SCOR001__CPY.TXT |
| 01/29/01 10:40a | 53,682 | SCOR007__CBL.TXT |
| 01/29/01 10:40a | 124,142 | SCOR011__CBL.TXT |
| 01/29/01 10:57a | 349 | SCOR011__CPY.TXT |
| 01/29/01 10:40a | 87,161 | SCOR012__CBL.TXT |
| 01/29/01 10:57a | 343 | SCOR012__CPY.TXT |
| 01/29/01 10:40a | 123,301 | SCOR013__CBL.TXT |
| 01/29/01 10:57a | 674 | SCOR013__CPY.TXT |
| 01/29/01 10:40a | 81,407 | SCOR016__CBL.TXT |
| 01/29/01 10:57a | 349 | SCOR016__CPY.TXT |
| 01/29/01 10:40a | 80,331 | SCOR017__CBL.TXT |
| 01/29/01 10:57a | 349 | SCOR017__CPY.TXT |
| 01/29/01 12:36p | 96,171 | SCOR018__CBL.TXT |
| 01/29/01 10:41a | 154,792 | SCOR019__CBL.TXT |
| 01/29/01 10:57a | 346 | SCOR019__CPY.TXT |
| 01/29/01 10:41a | 81,191 | SCOR020__CBL.TXT |
| 01/29/01 10:57a | 346 | SCOR020__CPY.TXT |
| 01/29/01 10:41a | 76,854 | SCOR021__CBL.TXT |
| 01/29/01 10:57a | 346 | SCOR021__CPY.TXT |
| 01/29/01 10:41a | 62,279 | SCOR022__CBL.TXT |
| 01/29/01 10:41a | 82,063 | SCOR023__CBL.TXT |
| 01/29/01 10:57a | 340 | SCOR023__CPY.TXT |
| 01/29/01 12:36p | 49,752 | SCOR024__CBL.TXT |
| 01/29/01 10:57a | 348 | SCOR024__CPY.TXT |
| 01/29/01 10:41a | 126,300 | SCOR025__CBL.TXT |
| 01/29/01 10:41a | 75,975 | SCOR028__CBL.TXT |
| 01/29/01 10:58a | 349 | SCOR028__CPY.TXT |
| 01/29/01 10:41a | 47,512 | SCOR029__CBL.TXT |

-continued

| | | |
|---|---|---|
| 01/29/01 12:36p | | 47,734 SCOR033__CBL.TXT |
| 01/29/01 10:41a | | 120,091 SCOR050__CBL.TXT |
| 01/29/01 10:41a | | 118,238 SCOR051__CBL.TXT |
| 01/29/01 10:41a | | 194,847 SCOR052__CBL.TXT |
| 01/29/01 10:41a | | 249,802 SCOR053__CBL.TXT |
| 01/29/01 10:41a | | 113,857 SCOR054__CBL.TXT |
| 01/29/01 10:41a | | 122,912 SCOR055__CBL.TXT |
| 01/29/01 10:41a | | 144,769 SCOR056__CBL.TXT |
| 01/29/01 10:41a | | 145,415 SCOR057__CBL.TXT |
| 01/29/01 10:41a | | 154,295 SCOR058__CBL.TXT |
| 01/29/01 10:41a | | 128,384 SCOR059__CBL.TXT |
| 01/29/01 10:41a | | 18,359 SCOR099__CBL.TXT |
| | | Directory of D:\M-9381 US\LIB |
| 01/31/01 03:27p | <DIR> | . |
| 01/31/01 03:31p | <DIR> | .. |
| 02/13/96 12:46p | | 514 CPY001__CPY.TXT |
| 11/23/00 04:59p | | 270 Cpy000__CPY.TXT |
| 01/29/01 04:51p | | 3,444 Cpy002__CPY.TXT |
| 01/29/01 04:51p | | 5,685 Cpy003__CPY.TXT |
| 09/30/98 04:02p | | 4,059 Cpy004__CPY.TXT |
| 09/30/98 03:43p | | 4,799 Cpy005__CPY.TXT |
| 10/06/00 02:21p | | 10,347 Libcdecb__CPY.TXT |
| 01/12/01 04:05p | | 16,444 cpyinv__CPY.TXT |
| 01/12/01 04:05p | | 786,094 libmsgcb__CPY.TXT |
| 01/12/01 04:05p | | 61,640 libreccb__CPY.TXT |
| 01/12/01 04:05p | | 54,510 libwstcb__CPY.TXT |
| | | Directory of D:\M-9381 US\LXN |
| 01/31/01 03:27p | <DIR> | . |
| 01/31/01 03:31p | <DIR> | .. |
| 01/29/01 10:37a | | 46,085 LX0A463__CBL.TXT |
| 01/29/01 10:37a | | 150,845 LX1A305__CBL.TXT |
| 01/29/01 10:37a | | 150,845 LX1A309__CBL.TXT |
| 01/29/01 10:37a | | 127,563 LX1E029__CBL.TXT |
| 01/29/01 10:37a | | 127,917 LX1E401__CBL.TXT |
| 01/29/01 10:37a | | 138,405 LX1E404__CBL.TXT |
| 01/29/01 10:37a | | 56,995 LX1E405__CBL.TXT |
| 01/29/01 10:37a | | 137,114 LX1E406__CBL.TXT |
| 01/29/01 10:37a | | 24,698 LX1E407__CBL.TXT |
| 01/29/01 10:37a | | 269,840 LX1E411__CBL.TXT |
| 01/29/01 10:37a | | 33,630 LX1E440__CBL.TXT |
| 01/29/01 10:37a | | 48,859 LX1E441__CBL.TXT |
| 01/29/01 10:38a | | 36,024 LX1E442__CBL.TXT |
| 01/29/01 10:38a | | 36,868 LX1E443__CBL.TXT |
| 01/29/01 10:38a | | 23,375 LX1E444__CBL.TXT |
| 01/29/01 10:38a | | 165,404 LX1E445__CBL.TXT |
| 01/29/01 10:38a | | 35,602 LX1E463__CBL.TXT |
| 01/29/01 10:38a | | 45,930 LX1R404__CBL.TXT |
| 01/29/01 10:38a | | 23,260 LX1R409__CBL.TXT |
| 01/29/01 10:38a | | 43,432 LX1R445__CBL.TXT |
| 01/29/01 10:38a | | 21,443 LX2A305__CBL.TXT |
| 01/29/01 10:38a | | 21,443 LX2A309__CBL.TXT |
| 01/29/01 10:38a | | 81,672 LX2E029__CBL.TXT |
| 01/29/01 10:38a | | 81,527 LX2E401__CBL.TXT |
| 01/29/01 10:38a | | 97,096 LX2E404__CBL.TXT |
| 01/29/01 10:38a | | 38,786 LX2E405__CBL.TXT |
| 01/29/01 10:38a | | 89,480 LX2E406__CBL.TXT |
| 01/29/01 10:38a | | 24,608 LX2E407__CBL.TXT |
| 01/29/01 10:38a | | 165,091 LX2E411__CBL.TXT |
| 01/29/01 10:38a | | 24,187 LX2E440__CBL.TXT |
| 01/29/01 10:38a | | 73,667 LX2E441__CBL.TXT |
| 01/29/01 10:38a | | 27,125 LX2E442__CBL.TXT |
| 01/29/01 10:38a | | 26,856 LX2E443__CBL.TXT |
| 01/29/01 10:38a | | 20,100 LX2E444__CBL.TXT |
| 01/29/01 10:38a | | 110,268 LX2E445__CBL.TXT |
| 01/29/01 10:38a | | 26,421 LX2E463__CBL.TXT |
| 01/29/01 10:38a | | 22,323 LX3A305__CBL.TXT |
| 01/29/01 10:38a | | 22,323 LX3A309__CBL.TXT |
| 01/29/01 10:38a | | 29,944 LX4A305__CBL.TXT |
| 01/29/01 10:38a | | 29,944 LX4A309__CBL.TXT |
| 01/29/01 10:38a | | 19,684 LX5A305__CBL.TXT |
| 01/29/01 10:38a | | 19,684 LX5A309__CBL.TXT |
| | | Directory of D:\M-9381 US\MFS |
| 01/31/01 03:28p | <DIR> | . |
| 01/31/01 03:31p | <DIR> | .. |
| 01/29/01 10:41a | | 222 ZABEND1__CBL.TXT |
| 01/29/01 10:41a | | 6,631 ZCALLSV__CBL.TXT |
| 01/29/01 10:41a | | 1,077 ZCBLERR__CBL.TXT |

-continued

| | | |
|---|---|---|
| 01/29/01 10:41a | | 4,857 ZCONECT__CBL.TXT |
| 01/29/01 10:41a | | 5,291 ZCRERPT__CBL.TXT |
| 01/29/01 10:41a | | 276 ZDEBUG1__CBL.TXT |
| 01/29/01 10:41a | | 393 ZDEBUG2__CBL.TXT |
| 01/29/01 10:41a | | 1,728 ZDISCON__CBL.TXT |
| 01/29/01 10:41a | | 1,041 ZGETTXT__CBL.TXT |
| 01/29/01 10:41a | | 6,932 ZINIINP__CBL.TXT |
| 01/29/01 10:41a | | 891 ZINTJUL__CBL.TXT |
| 01/29/01 10:41a | | 2,153 ZINTTME__CBL.TXT |
| 01/29/01 10:41a | | 829 ZJULDAY__CBL.TXT |
| 01/29/01 10:41a | | 624 ZJULDYN__CBL.TXT |
| 01/29/01 10:41a | | 1,479 ZJULSTM__CBL.TXT |
| 01/29/01 10:41a | | 1,562 ZJULTME__CBL.TXT |
| 01/29/01 10:41a | | 5,953 ZLEVENT__CBL.TXT |
| 01/29/01 10:41a | | 698 ZOLE001__CBL.TXT |
| 01/29/01 10:41a | | 1,691 ZOLE002__CBL.TXT |
| 01/29/01 10:41a | | 696 ZOLE100__CBL.TXT |
| 01/29/01 10:41a | | 696 ZOLE101__CBL.TXT |
| 01/29/01 10:41a | | 696 ZOLE102__CBL.TXT |
| 01/29/01 10:41a | | 696 ZOLE103__CBL.TXT |
| 01/29/01 10:41a | | 696 ZOLE104__CBL.TXT |
| 01/29/01 10:41a | | 696 ZOLE105__CBL.TXT |
| 01/29/01 10:41a | | 696 ZOLE106__CBL.TXT |
| 01/29/01 10:41a | | 696 ZOLE107__CBL.TXT |
| 01/29/01 10:41a | | 696 ZOLE108__CBL.TXT |
| 01/29/01 10:41a | | 696 ZOLE109__CBL.TXT |
| 01/29/01 10:41a | | 133,143 ZPREPRC__CBL.TXT |
| 01/29/01 10:41a | | 1,772 ZSQLERR__CBL.TXT |
| 01/29/01 10:41a | | 1,198 ZTIME01__CBL.TXT |
| 01/29/01 10:41a | | 1,769 ZTJULDY__CBL.TXT |
| 01/29/01 10:41a | | 2,111 ZTMFTRN__CBL.TXT |
| 01/29/01 10:41a | | 1,090 ZTRG001__CBL.TXT |
| 01/29/01 10:41a | | 492 ZTRG002__CBL.TXT |
| | Directory of D:\M-9381 US\MSC | |
| 01/31/01 03:30p | <DIR> | . |
| 01/31/01 03:31p | <DIR> | .. |
| 01/29/01 12:25p | | 53,642 BMSC201__CBL.TXT |
| 01/29/01 12:25p | | 130,025 BMSC230__CBL.TXT |
| 01/29/01 10:59a | | 977 BMSC230__CPY.TXT |
| 01/29/01 12:25p | | 133,301 BMSC262__CBL.TXT |
| 01/29/01 10:59a | | 982 BMSC262__CPY.TXT |
| 01/29/01 01:35p | | 113,486 BMSC263__CBL.TXT |
| 01/29/01 10:59a | | 330 BMSC263__CPY.TXT |
| 01/29/01 12:25p | | 154,552 BMSC267__CBL.TXT |
| 01/29/01 10:59a | | 1,308 BMSC267__CPY.TXT |
| 01/29/01 12:25p | | 134,918 BMSC275__CBL.TXT |
| 01/29/01 10:59a | | 977 BMSC275__CPY.TXT |
| 01/29/01 12:26p | | 153,076 BMSC276__CBL.TXT |
| 01/29/01 10:59a | | 1,305 BMSC276__CPY.TXT |
| 01/29/01 12:26p | | 106,890 BMSC300__CBL.TXT |
| 01/29/01 11:00a | | 330 BMSC300__CPY.TXT |
| 01/29/01 12:26p | | 104,861 BMSC301__CBL.TXT |
| 01/29/01 11:00a | | 330 BMSC301__CPY.TXT |
| 01/29/01 12:37p | | 171,201 BMSC350__CBL.TXT |
| 01/29/01 11:00a | | 330 BMSC350__CPY.TXT |
| 01/29/01 12:26p | | 128,125 BMSC351__CBL.TXT |
| 01/29/01 11:00a | | 330 BMSC351__CPY.TXT |
| 01/29/01 12:26p | | 132,623 BMSC352__CBL.TXT |
| 01/29/01 11:00a | | 979 BMSC352__CPY.TXT |
| 01/29/01 12:26p | | 375,914 BMSC359__CBL.TXT |
| 01/29/01 11:00a | | 2,271 BMSC359__CPY.TXT |
| 01/29/01 12:43p | | 171,267 BMSC360__CBL.TXT |
| 01/29/01 11:00a | | 330 BMSC360__CPY.TXT |
| 01/29/01 12:43p | | 143,913 BMSC370__CBL.TXT |
| 01/29/01 11:00a | | 330 BMSC370__CPY.TXT |
| 01/29/01 12:27p | | 130,614 BMSC373__CBL.TXT |
| 01/29/01 11:00a | | 330 BMSC373__CPY.TXT |
| 01/29/01 12:27p | | 109,484 BMSC375__CBL.TXT |
| 01/29/01 11:00a | | 330 BMSC375__CPY.TXT |
| 01/29/01 12:27p | | 109,876 BMSC376__CBL.TXT |
| 01/29/01 11:00a | | 330 BMSC376__CPY.TXT |
| 01/29/01 12:27p | | 131,522 BMSC382__CBL.TXT |
| 01/29/01 11:00a | | 330 BMSC382__CPY.TXT |
| 01/29/01 12:27p | | 134,514 BMSC383__CBL.TXT |
| 01/29/01 11:00a | | 330 BMSC383__CPY.TXT |
| 01/29/01 12:27p | | 124,580 BMSC385__CBL.TXT |
| 01/29/01 11:00a | | 1,300 BMSC385__CPY.TXT |
| 01/29/01 12:27p | | 124,591 BMSC394__CBL.TXT |
| 01/29/01 11:00a | | 330 BMSC394__CPY.TXT |

-continued

| | | |
|---|---|---|
| 01/29/01 12:15p | | 130,966 BMSC398_CBL.TXT |
| 01/29/01 11:00a | | 330 BMSC398_CPY.TXT |
| 01/29/01 12:44p | | 124,467 BMSC518_CBL.TXT |
| 01/29/01 11:00a | | 330 BMSC518_CPY.TXT |
| 01/29/01 12:44p | | 111,287 BMSC592_CBL.TXT |
| 01/29/01 11:00a | | 330 BMSC592_CPY.TXT |
| 01/29/01 12:44p | | 193,976 BMSC602_CBL.TXT |
| 01/29/01 11:00a | | 1,302 BMSC602_CPY.TXT |
| 01/29/01 12:44p | | 130,254 BMSC603_CBL.TXT |
| 01/29/01 11:00a | | 330 BMSC603_CPY.TXT |
| 01/29/01 12:14p | | 138,846 BMSC604_CBL.TXT |
| 01/29/01 11:01a | | 330 BMSC604_CPY.TXT |
| 01/29/01 12:28p | | 117,263 BMSC605_CBL.TXT |
| 01/29/01 11:01a | | 330 BMSC605_CPY.TXT |
| 01/29/01 12:27p | | 328,668 BMSC606_CBL.TXT |
| 01/29/01 11:01a | | 330 BMSC606_CPY.TXT |
| 01/29/01 12:15p | | 101,418 BMSC607_CBL.TXT |
| 01/29/01 11:01a | | 330 BMSC607_CPY.TXT |
| 01/29/01 10:39a | | 73,803 IMSC301_CBL.TXT |
| 01/29/01 10:53a | | 46,777 IMSC301_CPY.TXT |
| 01/29/01 10:39a | | 23,449 IMSC302_CBL.TXT |
| 01/29/01 10:53a | | 8,159 IMSC302_CPY.TXT |
| 01/29/01 10:39a | | 30,221 IMSC303_CBL.TXT |
| 01/29/01 10:53a | | 14,128 IMSC303_CPY.TXT |
| 01/29/01 10:39a | | 62,937 IMSC304_CBL.TXT |
| 01/29/01 10:53a | | 40,417 IMSC304_CPY.TXT |
| 01/29/01 10:39a | | 35,204 IMSC305_CBL.TXT |
| 01/29/01 10:53a | | 18,042 IMSC305_CPY.TXT |
| 01/29/01 10:39a | | 42,240 IMSC306_CBL.TXT |
| 01/29/01 10:53a | | 27,845 IMSC306_CPY.TXT |
| 01/29/01 10:39a | | 54,964 IMSC308_CBL.TXT |
| 01/29/01 10:53a | | 36,148 IMSC308_CPY.TXT |
| 01/29/01 10:39a | | 61,996 IMSC310_CBL.TXT |
| 01/29/01 10:53a | | 40,517 IMSC310_CPY.TXT |
| 01/29/01 04:44p | | 359,347 LMSC305_CBL.TXT |
| 01/29/01 04:44p | | 359,429 LMSC309_CBL.TXT |
| 01/29/01 04:52p | | 210,026 LMSC350_CBL.TXT |
| 01/29/01 12:46p | | 114,054 LMSC351_CBL.TXT |
| 01/29/01 10:47a | | 2,610 LMSC351_CPY.TXT |
| 01/29/01 01:37p | | 101,195 LMSC360_CBL.TXT |
| 01/29/01 12:37p | | 168,284 LMSC600_CBL.TXT |
| 01/29/01 04:44p | | 23,909 LMSC602_CBL.TXT |
| 01/29/01 12:37p | | 28,016 LMSC603_CBL.TXT |
| 01/29/01 12:38p | | 33,163 LMSC604_CBL.TXT |
| 01/29/01 12:38p | | 22,464 LMSC605_CBL.TXT |
| 01/29/01 12:38p | | 21,301 LMSC606_CBL.TXT |
| 01/29/01 12:38p | | 144,338 LMSC607_CBL.TXT |
| 01/29/01 04:44p | | 111,911 RMSC301m.TXT |
| 01/29/01 04:44p | | 47,627 RMSC302m.TXT |
| 01/29/01 04:44p | | 65,115 RMSC303m.TXT |
| 01/29/01 04:44p | | 88,736 RMSC304m.TXT |
| 01/29/01 04:35p | | 59,224 RMSC305m.TXT |
| 01/29/01 04:44p | | 68,814 RMSC306m.TXT |
| 01/29/01 04:44p | | 97,072 RMSC308m.TXT |
| 01/29/01 12:38p | | 223,681 SMSC301_CBL.TXT |
| 01/29/01 10:58a | | 675 SMSC301_CPY.TXT |
| 01/29/01 12:38p | | 89,057 SMSC302_CBL.TXT |
| 01/29/01 10:58a | | 675 SMSC302_CPY.TXT |
| 01/29/01 04:44p | | 129,411 SMSC303_CBL.TXT |
| 01/29/01 12:38p | | 250,088 SMSC304_CBL.TXT |
| 01/29/01 10:59a | | 672 SMSC304_CPY.TXT |
| 01/29/01 04:44p | | 57,109 SMSC305_CBL.TXT |
| 01/29/01 12:38p | | 197,292 SMSC306_CBL.TXT |
| 01/29/01 12:38p | | 284,622 SMSC308_CBL.TXT |
| 01/29/01 10:59a | | 1,641 SMSC308_CPY.TXT |
| 01/29/01 04:44p | | 57,109 SMSC309_CBL.TXT |
| 01/29/01 12:38p | | 147,371 SMSC310_CBL.TXT |
| 01/29/01 10:59a | | 996 SMSC310_CPY.TXT |
| | Directory of D:\M-9381 US\SCRIPTS | |
| 01/31/01 03:30p | <DIR> | . |
| 01/31/01 03:31p | <DIR> | .. |
| 11/28/00 11:44a | | 14,383 Fstdev_SCP.TXT |
| 01/29/01 10:35a | | 275,599 LNT_DEMO_SCP.TXT |
| 01/29/01 10:35a | | 83,059 LNT_OPS_SCP.TXT |
| 01/29/01 10:35a | | 67,790 LNT_USER_SCP.TXT |
| 01/29/01 10:35a | | 149,283 Lnt_advanced_SCP.TXT |
| 01/29/01 10:35a | | 280,531 Lnt_regntest_SCP.TXT |
| 01/29/01 10:35a | | 46,957 Lnt_security_SCP.TXT |
| 01/29/01 10:35a | | 285,104 Lnt_super_SCP.TXT |

-continued

| | | |
|---|---|---|
| 01/29/01 10:35a | | 15,897 NSK_OPS_SCP.TXT |
| 01/29/01 10:35a | | 9,682 NSK_USER_SCP.TXT |
| 01/29/01 10:35a | | 35,944 Nsk_advanced_SCP.TXT |
| 01/29/01 10:35a | | 53,921 Nsk_regntest_SCP.TXT |
| 01/29/01 10:35a | | 4,024 Nsk_security_SCP.TXT |
| 01/29/01 10:35a | | 56,196 Nsk_super_SCP.TXT |
| 10/24/00 08:24a | | 43,345 Pccase_SCP.TXT |
| 01/29/01 10:35a | | 85,214 RNT_OPS_SCP.TXT |
| 01/29/01 10:35a | | 69,866 RNT_USER_SCP.TXT |
| 01/29/01 10:35a | | 151,510 Rnt_advanced_SCP.TXT |
| 01/29/01 10:35a | | 282,853 Rnt_regntest_SCP.TXT |
| 01/29/01 10:35a | | 49,010 Rnt_security_SCP.TXT |
| 01/29/01 10:35a | | 287,425 Rnt_super_SCP.TXT |
| | | Directory of D:\M-9381 US\SQL |
| 01/31/01 03:31p | <DIR> | . |
| 01/31/01 03:31p | <DIR> | .. |
| 11/24/00 06:24p | | 3,616 Currency_Ref_Integ_Check_Execs_sql.txt |
| 05/13/99 05:12p | | 993 Relate_Markets_To_Std_PriceHdrs_sql.txt |
| 05/13/99 02:38p | | 2,297 Service_Ref_Integ_Check_Execs_sql.txt |
| 12/22/00 10:18a | | 114,758 create_all_procs_sql.txt |
| 01/11/01 03:57p | | 302,536 create_all_tables_sql.txt |
| | | Directory of D:\M-9381 US\WEBAPP |
| 01/31/01 03:35p | <DIR> | . |
| 01/31/01 03:31p | <DIR> | .. |
| 01/31/01 03:33p | <DIR> | FUNCS |
| 04/30/99 05:38p | | 1,582 Fstgwy_asp.txt |
| 01/31/01 03:33p | <DIR> | GENERAL |
| 06/13/00 01:33p | | 972 Index_htm.txt |
| 01/31/01 03:33p | <DIR> | SCRIPTS |
| 01/31/01 03:34p | <DIR> | SCRNS |
| 01/31/01 03:35p | <DIR> | STYLES |
| | | Directory of D:\M-9381 US\WEBAPP\FUNCS |
| 01/31/01 03:33p | <DIR> | . |
| 01/31/01 03:35p | <DIR> | .. |
| 01/29/01 11:20a | | 836 FUNC001_ASP.TXT |
| 01/29/01 11:20a | | 966 FUNC012_ASP.TXT |
| 01/29/01 11:20a | | 845 FUNC014_ASP.TXT |
| 01/29/01 11:20a | | 955 FUNC016_ASP.TXT |
| 01/29/01 11:20a | | 955 FUNC017_ASP.TXT |
| 01/29/01 11:20a | | 855 FUNC019_ASP.TXT |
| 01/29/01 11:20a | | 958 FUNC020_ASP.TXT |
| 01/29/01 11:20a | | 964 FUNC022_ASP.TXT |
| 01/29/01 11:20a | | 951 FUNC023_ASP.TXT |
| 01/29/01 11:20a | | 961 FUNC024_ASP.TXT |
| 01/29/01 11:20a | | 954 FUNC025_ASP.TXT |
| 01/29/01 11:20a | | 962 FUNC026_ASP.TXT |
| 01/29/01 11:20a | | 960 FUNC028_ASP.TXT |
| 01/29/01 11:20a | | 963 FUNC050_ASP.TXT |
| 01/29/01 11:20a | | 859 FUNC053_ASP.TXT |
| 01/29/01 11:20a | | 969 FUNC054_ASP.TXT |
| 01/29/01 11:20a | | 843 FUNC055_ASP.TXT |
| 01/29/01 11:20a | | 854 FUNC056_ASP.TXT |
| 01/29/01 11:20a | | 966 FUNC057_ASP.TXT |
| 01/29/01 11:20a | | 965 FUNC070_ASP.TXT |
| 01/29/01 11:20a | | 965 FUNC071_ASP.TXT |
| 01/29/01 11:20a | | 973 FUNC072_ASP.TXT |
| 01/29/01 11:20a | | 973 FUNC073_ASP.TXT |
| 01/29/01 11:20a | | 970 FUNC074_ASP.TXT |
| 01/29/01 11:20a | | 968 FUNC075_ASP.TXT |
| 01/29/01 11:20a | | 964 FUNC076_ASP.TXT |
| 01/29/01 11:20a | | 974 FUNC077_ASP.TXT |
| 01/29/01 11:20a | | 977 FUNC078_ASP.TXT |
| 01/29/01 11:20a | | 976 FUNC079_ASP.TXT |
| 01/29/01 11:20a | | 954 FUNC103_ASP.TXT |
| 01/29/01 11:20a | | 960 FUNC104_ASP.TXT |
| 01/29/01 11:20a | | 953 FUNC106_ASP.TXT |
| 01/29/01 11:20a | | 951 FUNC107_ASP.TXT |
| 01/29/01 11:20a | | 949 FUNC114_ASP.TXT |
| 01/29/01 11:20a | | 962 FUNC115_ASP.TXT |
| 01/29/01 11:20a | | 952 FUNC116_ASP.TXT |
| 01/29/01 11:20a | | 953 FUNC117_ASP.TXT |
| 01/29/01 11:20a | | 852 FUNC118_ASP.TXT |
| 01/29/01 11:20a | | 964 FUNC121_ASP.TXT |
| 01/29/01 11:20a | | 970 FUNC122_ASP.TXT |
| 01/29/01 11:20a | | 963 FUNC123_ASP.TXT |
| 01/29/01 11:20a | | 961 FUNC124_ASP.TXT |
| 01/29/01 11:20a | | 959 FUNC126_ASP.TXT |

-continued

| | | |
|---|---|---|
| 01/29/01 11:20a | 972 | FUNC127__ASP.TXT |
| 01/29/01 11:20a | 962 | FUNC128__ASP.TXT |
| 01/29/01 11:20a | 963 | FUNC129__ASP.TXT |
| 01/29/01 11:20a | 971 | FUNC191__ASP.TXT |
| 01/29/01 11:20a | 967 | FUNC192__ASP.TXT |
| 01/29/01 11:20a | 972 | FUNC193__ASP.TXT |
| 01/29/01 11:20a | 967 | FUNC194__ASP.TXT |
| 01/29/01 11:20a | 977 | FUNC195__ASP.TXT |
| 09/28/00 10:23a | 847 | FUNC310__ASP.TXT |
| 01/29/01 11:20a | 861 | FUNC702__ASP.TXT |
| 01/29/01 11:20a | 867 | FUNC703__ASP.TXT |
| 01/29/01 11:20a | 859 | FUNC704__ASP.TXT |
| 01/29/01 11:20a | 953 | FUNC706__ASP.TXT |
| 01/29/01 11:20a | 969 | FUNC707__ASP.TXT |
| 01/29/01 11:20a | 847 | FUNC708__ASP.TXT |
| 01/29/01 11:20a | 849 | FUNC709__ASP.TXT |
| 01/29/01 11:20a | 852 | FUNC710__ASP.TXT |
| 01/29/01 11:20a | 846 | FUNC711__ASP.TXT |
| 01/29/01 11:20a | 969 | FUNC712__ASP.TXT |
| 01/29/01 11:20a | 957 | FUNC713__ASP.TXT |
| 01/29/01 11:20a | 967 | FUNC714__ASP.TXT |
| 01/29/01 11:20a | 957 | FUNC715__ASP.TXT |
| 01/29/01 11:20a | 977 | FUNC722__ASP.TXT |
| 01/29/01 11:20a | 963 | FUNC723__ASP.TXT |
| 01/29/01 11:20a | 977 | FUNC724__ASP.TXT |
| 01/29/01 11:20a | 966 | FUNC725__ASP.TXT |
| 01/29/01 11:20a | 968 | FUNC726__ASP.TXT |
| 01/29/01 11:20a | 971 | FUNC727__ASP.TXT |
| 01/29/01 11:20a | 978 | FUNC729__ASP.TXT |
| 01/29/01 11:20a | 965 | FUNC730__ASP.TXT |
| 01/29/01 11:20a | 971 | FUNC731__ASP.TXT |
| 01/29/01 11:20a | 967 | FUNC732__ASP.TXT |
| 01/29/01 11:20a | 964 | FUNC733__ASP.TXT |
| 01/29/01 11:20a | 967 | FUNC734__ASP.TXT |
| 01/29/01 11:20a | 862 | FUNC741__ASP.TXT |
| 01/29/01 11:20a | 868 | FUNC742__ASP.TXT |
| 01/29/01 11:20a | 858 | FUNC743__ASP.TXT |
| 01/29/01 11:20a | 860 | FUNC744__ASP.TXT |
| 01/29/01 11:20a | 863 | FUNC745__ASP.TXT |
| 01/29/01 11:20a | 860 | FUNC746__ASP.TXT |
| 01/29/01 11:20a | 866 | FUNC747__ASP.TXT |
| 01/29/01 11:20a | 856 | FUNC748__ASP.TXT |
| 01/29/01 11:20a | 858 | FUNC749__ASP.TXT |
| 01/29/01 11:20a | 861 | FUNC750__ASP.TXT |
| 01/29/01 11:20a | 861 | FUNC751__ASP.TXT |
| 01/29/01 11:20a | 857 | FUNC752__ASP.TXT |
| 01/29/01 11:20a | 858 | FUNC753__ASP.TXT |
| 01/29/01 11:20a | 856 | FUNC754__ASP.TXT |
| 01/29/01 11:20a | 857 | FUNC755__ASP.TXT |
| 01/29/01 11:20a | 846 | FUNC764__ASP.TXT |
| 01/29/01 11:20a | 846 | FUNC765__ASP.TXT |
| 01/29/01 11:20a | 848 | FUNC766__ASP.TXT |
| 01/29/01 11:20a | 866 | FUNC801__ASP.TXT |
| 01/29/01 11:20a | 869 | FUNC802__ASP.TXT |
| 01/29/01 11:20a | 869 | FUNC803__ASP.TXT |
| 01/29/01 11:20a | 861 | FUNC804__ASP.TXT |
| 01/29/01 11:20a | 864 | FUNC805__ASP.TXT |
| 01/29/01 11:20a | 868 | FUNC806__ASP.TXT |
| 01/29/01 11:20a | 867 | FUNC807__ASP.TXT |
| 01/29/01 11:20a | 859 | FUNC808__ASP.TXT |
| 01/29/01 11:20a | 975 | FUNC809__ASP.TXT |
| 01/29/01 11:20a | 978 | FUNC810__ASP.TXT |
| 01/29/01 11:20a | 978 | FUNC811__ASP.TXT |
| 01/29/01 11:20a | 969 | FUNC812__ASP.TXT |
| 01/29/01 11:20a | 970 | FUNC813__ASP.TXT |
| 01/29/01 11:20a | 865 | FUNC814__ASP.TXT |
| 01/29/01 11:20a | 867 | FUNC815__ASP.TXT |
| 01/29/01 11:20a | 862 | FUNC816__ASP.TXT |
| 01/29/01 11:20a | 869 | FUNC817__ASP.TXT |
| 01/29/01 11:20a | 868 | FUNC818__ASP.TXT |
| 01/29/01 11:20a | 859 | FUNC819__ASP.TXT |
| 01/29/01 11:20a | 860 | FUNC820__ASP.TXT |
| 01/29/01 11:20a | 961 | FUNC899__ASP.TXT |

Directory of D:\M-9381 US\WEBAPP\GENERAL

| | | |
|---|---|---|
| 01/31/01 03:33p | <DIR> | . |
| 01/31/01 03:35p | <DIR> | .. |
| 06/17/99 02:09p | 5,428 | Implicit__asp.txt |
| 06/15/99 01:47p | 532 | LGNERR__asp.txt |
| 05/19/00 03:56p | 11,056 | Splash__asp.txt |

-continued

| | | |
|---|---|---|
| 05/18/00 12:37p | | 4,554 copyright__htm.txt |
| 12/05/00 06:38p | | 15,911 counter__htm.txt |
| 05/19/00 11:25a | | 1,798 intranetdenied__htm.txt |
| 12/05/00 05:13p | | 4,059 intranethomepage__asp.txt |
| 05/19/00 11:25a | | 1,913 intranetieonly__htm.txt |
| 07/06/00 02:24p | | 3,764 logon__asp.txt |
| 01/29/01 11:20a | | 16,715 menu__asp.txt |
| 05/08/00 02:59p | | 2,621 preload__htm.txt |
| | Directory of D:\M-9381 US\WEBAPP\SCRIPTS | |
| 01/31/01 03:33p | <DIR> | . |
| 01/31/01 03:35p | <DIR> | .. |
| 11/20/00 11:43a | | 6,937 DTL01__SCP.TXT |
| 11/20/00 01:29p | | 27,297 DTL02__SCP.TXT |
| 06/22/99 11:23a | | 5,381 DTL03__SCP.TXT |
| 09/18/00 03:28p | | 210 DTL11__SCP.TXT |
| 09/29/00 11:02a | | 6,528 DTL12__SCP.TXT |
| 10/12/00 05:03p | | 10,462 DTL21__INC.TXT |
| 07/30/99 10:37a | | 577 access__inc.txt |
| 10/12/00 02:02p | | 536 applid__js.txt |
| 10/12/00 02:02p | | 525 applid__scp.txt |
| 06/22/99 10:41a | | 852 brzlib__js.txt |
| 03/26/99 03:59p | | 400 dtlmnu__scp.txt |
| 01/29/01 11:20a | | 19,869 function__scp.txt |
| 06/15/99 01:51p | | 4,389 general__scp.txt |
| 06/24/99 10:46p | | 620 ietest__inc.txt |
| 01/29/01 11:20a | | 2,087 implicit__scp.txt |
| 07/06/00 09:17a | | 4,815 intranetlogon__inc.txt |
| 10/05/00 10:26a | | 1,005 intranetlogon__lst.txt |
| 06/15/99 01:52p | | 206 parkingspot__scp.txt |
| 06/07/99 10:29a | | 318 preload__scp.txt |
| | Directory of D:\M-9381 US\WEBAPP\SCRNS | |
| 01/31/01 03:34p | <DIR> | . |
| 01/31/01 03:35p | <DIR> | .. |
| 01/29/01 11:20a | | 2,258 scrn000__HTM.TXT |
| 01/29/01 11:20a | | 4,135 scrn001__HTM.TXT |
| 01/29/01 11:20a | | 6,757 scrn002__HTM.TXT |
| 01/29/01 11:20a | | 7,939 scrn007__HTM.TXT |
| 01/29/01 11:20a | | 52,553 scrn011__HTM.TXT |
| 01/29/01 11:20a | | 12,476 scrn012__HTM.TXT |
| 01/29/01 11:20a | | 17,576 scrn013__HTM.TXT |
| 01/29/01 11:20a | | 20,842 scrn016__HTM.TXT |
| 01/29/01 11:20a | | 21,439 scrn017__HTM.TXT |
| 01/29/01 11:20a | | 10,351 scrn018__HTM.TXT |
| 01/29/01 11:20a | | 18,712 scrn019__HTM.TXT |
| 01/29/01 11:20a | | 12,248 scrn020__HTM.TXT |
| 01/29/01 11:20a | | 10,854 scrn021__HTM.TXT |
| 01/29/01 11:20a | | 10,674 scrn023__HTM.TXT |
| 01/29/01 11:20a | | 32,207 scrn025__HTM.TXT |
| 01/29/01 11:20a | | 10,632 scrn028__HTM.TXT |
| 01/29/01 11:20a | | 2,009 scrn033__HTM.TXT |
| 01/29/01 11:20a | | 24,463 scrn050__HTM.TXT |
| 01/29/01 11:20a | | 21,983 scrn051__HTM.TXT |
| 01/29/01 11:20a | | 16,599 scrn052__HTM.TXT |
| 01/29/01 11:20a | | 28,906 scrn053__HTM.TXT |
| 01/29/01 11:20a | | 17,165 scrn054__HTM.TXT |
| 01/29/01 11:20a | | 25,259 scrn055__HTM.TXT |
| 01/29/01 11:20a | | 35,997 scrn056__HTM.TXT |
| 01/29/01 11:20a | | 16,983 scrn057__HTM.TXT |
| 01/29/01 11:20a | | 35,344 scrn058__HTM.TXT |
| 01/29/01 11:20a | | 35,295 scrn059__HTM.TXT |
| 01/29/01 11:20a | | 27,793 scrn100__HTM.TXT |
| 01/29/01 11:20a | | 13,821 scrn101__HTM.TXT |
| 01/29/01 11:20a | | 15,876 scrn102__HTM.TXT |
| 01/29/01 11:20a | | 102,399 scrn103__HTM.TXT |
| 01/29/01 11:20a | | 13,165 scrn104__HTM.TXT |
| 01/29/01 11:20a | | 24,506 scrn106__HTM.TXT |
| 01/29/01 11:20a | | 12,292 scrn111__HTM.TXT |
| 01/29/01 11:20a | | 15,028 scrn112__HTM.TXT |
| 01/29/01 11:20a | | 17,741 scrn140__HTM.TXT |
| 01/29/01 11:20a | | 9,836 scrn141__HTM.TXT |
| 01/29/01 11:20a | | 40,463 scrn142__HTM.TXT |
| 01/29/01 11:20a | | 13,301 scrn143__HTM.TXT |
| 01/29/01 11:20a | | 9,975 scrn186__HTM.TXT |
| 01/29/01 11:20a | | 20,287 scrn190__HTM.TXT |
| 01/29/01 11:20a | | 22,630 scrn191__HTM.TXT |
| 01/29/01 11:20a | | 36,172 scrn192__HTM.TXT |
| 01/29/01 11:20a | | 118,630 scrn193__HTM.TXT |
| 01/29/01 11:20a | | 20,610 scrn194__HTM.TXT |

-continued

| | |
|---|---|
| 01/29/01 11:20a | 42,586 scrn196__HTM.TXT |
| 01/29/01 11:20a | 31,063 scrn199__HTM.TXT |
| 01/29/01 11:20a | 42,613 scrn301__HTM.TXT |
| 01/29/01 11:20a | 5,059 scrn302__HTM.TXT |
| 01/29/01 11:20a | 15,551 scrn303__HTM.TXT |
| 01/29/01 11:20a | 51,827 scrn304__HTM.TXT |
| 01/29/01 11:20a | 24,470 scrn305__HTM.TXT |
| 01/29/01 11:20a | 27,070 scrn306__HTM.TXT |
| 01/29/01 11:20a | 46,332 scrn308__HTM.TXT |
| 01/29/01 11:20a | 53,218 scrn310__HTM.TXT |
| 01/29/01 11:20a | 30,568 scrn701__HTM.TXT |
| 01/29/01 11:20a | 45,497 scrn702__HTM.TXT |
| 01/29/01 11:20a | 19,933 scrn703__HTM.TXT |
| 01/29/01 11:20a | 39,375 scrn704__HTM.TXT |
| 01/29/01 11:20a | 16,408 scrn705__HTM.TXT |
| 01/29/01 11:20a | 27,433 scrn706__HTM.TXT |
| 01/29/01 11:20a | 21,786 scrn707__HTM.TXT |
| 01/29/01 11:20a | 36,503 scrn708__HTM.TXT |
| 01/29/01 11:20a | 29,499 scrn709__HTM.TXT |
| 01/29/01 11:20a | 44,583 scrn710__HTM.TXT |
| 01/29/01 11:20a | 18,586 scrn711__HTM.TXT |
| 01/29/01 11:20a | 36,156 scrn712__HTM.TXT |
| 01/29/01 11:20a | 23,476 scrn713__HTM.TXT |
| 01/29/01 11:20a | 47,967 scrn714__HTM.TXT |
| 01/29/01 11:20a | 10,842 scrn717__HTM.TXT |
| 01/29/01 11:20a | 39,203 scrn718__HTM.TXT |
| 01/29/01 11:20a | 49,165 scrn723__HTM.TXT |
| 01/29/01 11:20a | 51,030 scrn724__HTM.TXT |
| 01/29/01 11:20a | 26,405 scrn727__HTM.TXT |
| 01/29/01 11:20a | 55,914 scrn728__HTM.TXT |
| 01/29/01 11:20a | 49,670 scrn729__HTM.TXT |
| 01/29/01 11:20a | 50,601 scrn730__HTM.TXT |
| 01/29/01 11:20a | 24,118 scrn731__HTM.TXT |
| 01/29/01 11:20a | 40,247 scrn732__HTM.TXT |
| 01/29/01 11:20a | 2,858 scrn901__HTM.TXT |
| 01/29/01 11:20a | 4,185 scrn903__HTM.TXT |
| 01/29/01 11:20a | 31,788 scrn999__HTM.TXT |

Directory of D:\M-9381 US\WEBAPP\STYLES

| | | |
|---|---|---|
| 01/31/01 03:35p | <DIR> | . |
| 01/31/01 03:35p | <DIR> | .. |
| 04/12/99 12:09p | | 332 props__css.txt |
| 06/22/99 11:19a | | 844 scrns__css.txt |
| Total Files Listed: | | |
| 866 File(s) | | 41,467,133 bytes |

The contents of the compact disk are a part of the present disclosure, and are incorporated by reference herein in their entireties.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Field

The present invention relates generally to pricing systems and, in particular, to a system and method of real-time pricing.

2. Description of the Related Art

Many products and services are commodities that are sold in very competitive markets. New competition can also come, for example, from product and service improvements, new products, new services, lower prices, new technology, the use of the Internet, mergers, and acquisitions. Pricing is often a major factor in a customer's decision as to what product or service to purchase or use. In many markets, the capability to manage pricing strategies better than the competition can be the competitive advantage that is needed to succeed in the competitive market.

Many different pricing strategies have been developed by companies to gain a competitive advantage over the competition. One such strategy employed by companies is "volume discounting." Companies provide volume discounts to influence consumers to purchase its products and services. Volume discounting affords the benefits of a large number or quantity of purchases, typically within a set period of time (e.g., a billing cycle). A consumer benefits from his or her prior purchases in that all the purchases in a billing cycle are considered in applying the volume discount.

Because the total volume of products or services purchased by a consumer is not known until the end of a billing cycle, the volume discount, and as a result, the actual price of the product or service as it applies to the consumer, cannot be determined until the end of a billing cycle. Thus, even though pricing may be a major or deciding factor in a consumer's decision, currently, the benefit afforded by volume discounting is determined at the end of a billing cycle. At the time the consumer considers making a product or service purchase, the consumer is provided a price that fails to account for volume discounting and, as a result, is likely higher than the price the consumer might end up paying.

Thus, the consumer is likely to base his or her purchasing decision on an incorrect price, such as, by way of example, a unit price (e.g., a price that does not take into consideration volume discounting). A company can benefit greatly by being able to provide a price that is closer to the actual price the consumer is likely to pay after accounting for the volume discounts, especially if it is a lower price. Therefore, what is needed is an infrastructure that enables a company to manage its pricing strategies and to provide a price that is more indicative of the price the consumer will ultimately pay.

SUMMARY

The present disclosure is directed to a system and corresponding methods that facilitate the calculation of a real-time price for a transaction during a billing cycle that accounts for volume discounts resulting from transactions that occurred previously during the billing cycle. A data processing system maintains a record of the transactions that occur during a billing cycle. The data processing system then calculates a real-time price quote for the transaction by applying volume discounts resulting from the transactions that previously occurred during the billing cycle.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a method for pricing transactions in real-time includes: receiving a request for a real-time price quote for a transaction from a first account, the request being received at a first instance in time during a billing cycle; determining a first production service, the first production service being a component of the transaction; determining a count of first production service instances representing the first production service in the received transaction; determining a billable entity for the transaction, the billable entity comprising one or more related accounts, wherein the related accounts includes the first account; determining a total of the first production service instances purchased by the related accounts during the billing cycle up to the first instance in time, the total including the count of the first production service instances in the received transaction; determining a price applicable to the total of the first production service instances based on a pricing method; and apportioning the price to the received transaction based on the count of the first production service instance in the received transaction.

In another embodiment, a method for real-time pricing includes: receiving a request for a real-time price quote for a transaction, the request being received at a first instance in time during a billing cycle, wherein the transaction comprises a number of first production service instances, each first production service instance representing a first production service; determining a total count of production service instances consumed during the billing cycle up to the first instance in time based on a pricing relationship; determining a billing service appropriate for the first production service; calculating a price for the first production service from a price table based on a first attribute for the billing service and the total count of production service instances consumed; and apportioning the price to the received transaction based on the number of first production service instances in the transaction.

In still another embodiment, a computer-readable storage medium has stored thereon computer instructions that, when executed by a computer, cause the computer to: receive a request for a real-time price quote for a transaction, the request being received at a first instance in time during a billing cycle, wherein the transaction comprises a number of first production service instances, each instance representing a first production service; determine a total count of production service instances consumed during the billing cycle up to the first instance in time based on a pricing relationship; determine a billing service appropriate for the first production service; calculate a price for the first production service from a price table based on a first attribute for the billing service and the total count of production service instances consumed; and apportion the price to the received transaction based on the number of first production service instances in the transaction.

These and other embodiments of the present invention will also become readily apparent to those skilled in the art from the following detailed description of the embodiments having reference to the attached figures, the invention not being limited to any particular embodiment(s) disclosed.

DETAILED DESCRIPTION

Figure 1:
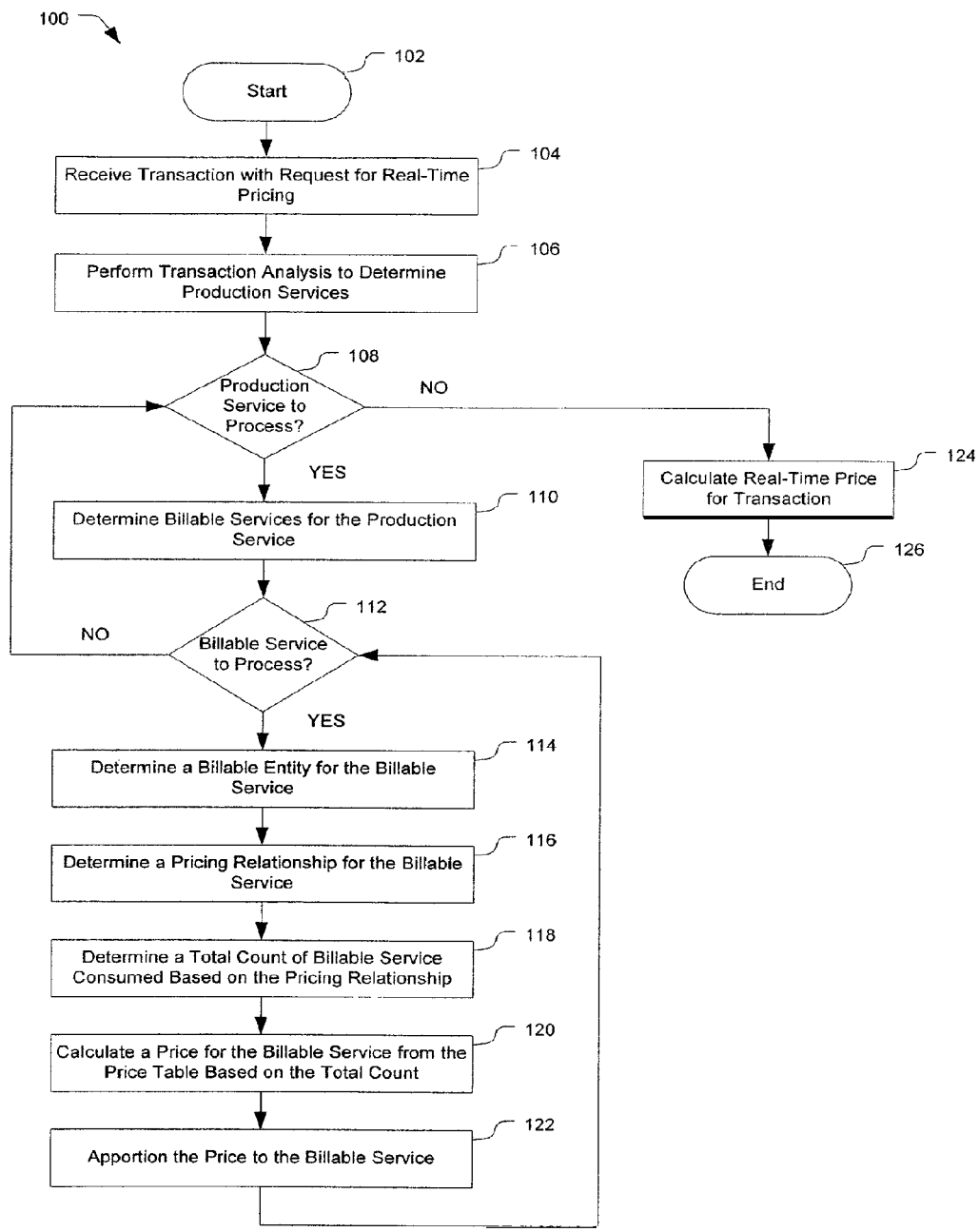
FIG. 1 illustrates a flow chart of an exemplary method for calculating a real-time price with volume discounting.

According to this invention, certain limitations imposed by conventional pricing systems have been overcome.

A data processing system and corresponding methods, according to an embodiment of the present invention, facilitates a real-time pricing of a transaction with volume discounting. "Transaction" here generally refers to a product or service that is offered by a provider (e.g., manufacturer, retailer, wholesaler, distributor, service provider, etc.) for consumption by one or more consumers. In one embodiment, the provider may be the operator of the data processing system. In another embodiment, the provider may purchase the services offered by the data processing system as disclosed herein from the operator or administrator of the data processing system (e.g., the provider of the transaction is different from the provider of the data processing system services).

In one embodiment, the data processing system receives during a billing cycle a request for a real-time price quote for a transaction from, for example, an account. The account may be a consumer of the transaction. The billing cycle specifies a time duration (e.g., day, week, month, quarter, year), at the end of which the account is billed for the transactions consumed or purchased during the billing cycle.

The data processing system analyzes the transaction to determine the transaction's various components. The transaction provider may define the components of the transaction. The conversion of the transaction into its components allows the transaction provider to determine the cost of the transaction, in component parts, which in turn, enable the transaction provider to determine an appropriate price for the transaction. A suitable database system for implementing the transaction analysis in accordance with the present invention is described in U.S. Pat. No. 6,052,672, entitled "DATA PROCESSING SYSTEM FOR COMPLEX PRICING AND TRANSACTIONAL ANALYSIS," which is hereby incorporated by reference in its entirety. However, other database systems can be used to implement a data processing system using the principles described herein.

In one embodiment, the data processing system calculates a real-time price for the transaction during a billing cycle as if it was the end of the billing cycle. The data processing system breaks down the transaction into its component parts. The component parts are then priced by applying a volume discount applicable to each component to determine a real-time price for each component. The data processing system then totals the real-time price of the components to determine the real-time price of the transaction.

The volume discount for a component may result from pricing relationships between parties (e.g., relationships between a number of components, accounts, customers, etc.) and the prior purchases of the component during the billing cycle up to this time by the parties in the pricing relationship. The data processing system applies the volume discount applicable to a component to determine the price of the component. Thus, the data processing system applies all the relationship pricing and volume discounting known during the billing cycle up to the time when it received the request for quote to determine the real-time price of the transaction.

In another embodiment, the data processing system calculates a variance to the real-time transaction price. At the end of the billing cycle, the data processing system calculates a price for each transaction purchased during the billing cycle. In one embodiment, the data processing system calculates a price for the transaction by determining a price for each component of a transaction in the manner outlined above. This price is then compared to the real-time price quoted during the billing cycle (e.g., at the time the request for real-time price quote is received). If there is a variance or difference between the two prices, the data processing system may make or report adjustments as necessary. For example, there may have been subsequent purchases of a component of the transaction after the time of providing the real-time price quote. The subsequent purchases of the component may result in a larger volume discount, which, in turn, causes a variance in price (e.g., results in a lower price for the transaction).

Even though this invention is suitable to providing real-time pricing of various products and services in many industries (e.g., financial services, internet services, telecommunication services, etc.), the invention will be further disclosed in the context of the data processing system providing real-time pricing with volume discounting of financial products offered by a financial services company (FSC), such as, retail bank, wholesale bank, corporate bank, and investment bank.

Figure 2:
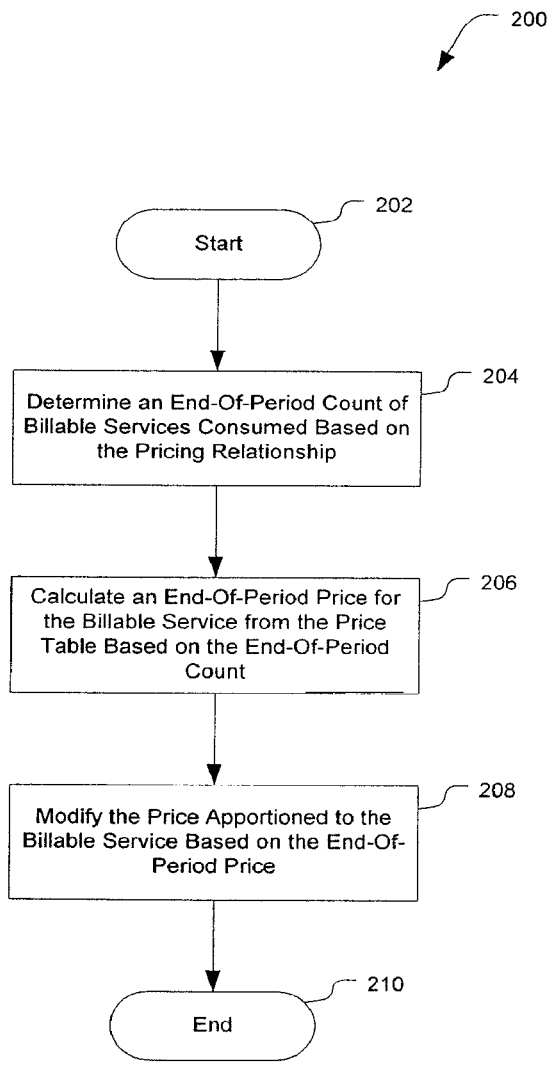
FIG. 2 illustrates a flow chart of an exemplary method for calculating a variance to a real-time price with volume discounting.

Embodiments of the present invention are understood by referring to FIGS. 1-2 of the drawings. Throughout the drawings, components that correspond to components shown in previous figures are indicated using the same reference numbers.

The detailed description that follows is presented in terms of processes and symbolic representations of operations performed by conventional computers.

Transaction Overview

A transaction instance (e.g., financial transaction instance) takes place when a FSC provides a financial service and when a client or consumer purchases or consumes the financial service. For example, an FSC may provide one or more financial services that are bundled together and offered to clients as financial transactions. Examples of financial transactions are checking accounts, cash management accounts, mortgages, funds transfers, safe deposit boxes, and the like.

In one embodiment, an FSC can use the data processing system to provide a real-time pricing of one or more financial transactions. Each financial transaction is defined in the data processing system in its component parts called production services. Thus, a financial transaction is related to the production services that map to or make up the financial transaction. The production services defining a particular financial transaction are the individual actions that the FSC performs or that the FSC wishes to account for in performing or processing the financial transaction. Production services for a financial transaction may include, by way of example, debit from an account, credit to an account, over draft approval, and computer connection. Production services are akin to a bill of materials for a manufacturer in that each transaction can be defined by the production services that are required to build or provide that transaction.

For clarity, the language of U.S. Pat. No. 6,052,672 is used herein. In particular, to distinguish an actual occurrence of a financial transaction performed by an FSC from a representation of the financial transaction in the data processing system, the actual occurrence of the financial transaction will be referred to as a financial transaction instance. Similarly, a production service instance is the representation of an actual occurrence of a specific production service performed by the FSC.

A production service is further defined in the data processing system in its component parts called billing or billable services. Billing services and billable service are used interchangeably herein. The billable services are related to activities having a cost or price, enabling the FSC to determine the cost of providing the financial transaction and the fees or prices the FSC is going to derive, earn, or charge the consumer (e.g., account) of the transaction. In one embodiment, the billable services are what appear on an accounting statement sent to the consumer. Thus, the consumer is informed of the transactions consumed, the related production services consumed, the related billable services consumed, and the price charged for each of the billable services.

A billable service may be mapped to one or more price tables in the data processing system. The cost and/or price associated with a billable service is recorded in a price table. The price table includes pricing rules for the associated billable service.

The data processing system maintains records for one or more billable entities. "Billable entity" here generally refers to a grouping of accounts for the purpose of applying volume discounting. Volume discounting may span the activity of the accounts within the billable entity. An account may be thought of as the consumer of the transaction. For example, a customer may actually be many companies or related companies that may be transacting with the FSC on one or more accounts. The billable entity is a composition of the accounts without regard to who the customers are, or whether one customer is involved or more than one customers are involved. Thus, volume discounting may span the activity of the accounts within a particular billable entity without regard to who the actual customers are or the number of customers involved in the billable entity.

In one embodiment, the data processing system provides for relationship pricing in conjunction with volume discounting. A pricing relationship may exist between a number of billable services, accounts, customers, and the like. For relationship pricing, the billable services, accounts, or customers in a relationship are factored in calculating a real-time price for a transaction. Relationship pricing in conjunction with volume discounting is an application of the volume discount based on the activities of the elements (i.e., billable services, accounts, customers) in a particular pricing relationship.

For example, as explained above, a group of accounts may be grouped together in a billable entity, creating a pricing relationship for the purposes of applying a volume discount. In another example, a group of billable services may be grouped together, creating a pricing relationship for the purposes of applying a volume discount. The volume discount is determined from the activity of the billable services within the group across all accounts in a particular billing entity. In still another example, a pricing relationship can exist for a group of accounts (e.g., not a complete billing entity) for a particular billable service. The volume discount is determined from the activity of the particular billing service across the group of accounts.

Billable services, pricing of billable services, pricing relationships, and relationship pricing is further described in U.S. Pat. No. 6,052,672. Pricing methods, including volume discounting is further described in the co-pending and commonly owned U.S. patent application Ser. No. 09/183,335 entitled "DATA PROCESSING SYSTEM FOR PRICING, COSTING AND BILLING OF FINANCIAL TRANSACTIONS."

Method for Calculating a Real-Time Price with Volume Discounting

In one embodiment, the data processing system facilitates the calculation of a real-time price for a financial transaction with volume discounting at any time in a billing cycle. The data processing system contains data and program logic to receive a request to provide a real-time price quote for a financial transaction and calculates a real-time price that includes applicable volume discounts. The data processing system calculates the real-time price for the financial transaction irrespective of point in time within a particular billing cycle. The volume discounting is determined from pricing relationships provided by the data processing system.

FIG. 1 illustrates a flow chart of an exemplary method 100 for calculating a real-time price of a financial transaction with volume discounting. Beginning at a start step 102, an FSC creates and defines the financial transactions and the mapping rules for the transactions, including the production services and the billing services, as maintained in the data processing system. The FSC also creates and defines the billing entities, accounts, pricing relationships, etc. maintained in the data processing system.

For example, the FSC defines a "wire transfer" as one financial transaction. The wire transfer is mapped to include three production services: "debit from account," "credit to account," and "overdraft protection." Each of the production services is mapped to a respective billable service, and each billable service is respectively mapped to a price table. The FSC may create a billing entity to include four accounts: "Account A," "Account B," "Account C," and "Account D." Accounts A and B belong to Company ABC, and Accounts C and D belong to Company XYZ. The FSC sets a monthly billing cycle for the billing entity.

Furthermore, the FSC may agree to and create a pricing relationship for Accounts A, B, and C for the overdraft protection service. The pricing relationship entitles Accounts A, B, and C to the following volume discounting for the overdraft protection service:

| | |
|---|---|
| Quantity 1 to 20 | $4.00/each |
| Quantity 21 to 50 | $3.00/each |
| Quantity 51 to 100 | $2.00/each |
| Quantity 100+ | $1.00/each |

Thus, if the combined volume of overdraft protections used or purchased by the group of accounts in the pricing relationship (Accounts A, B, and C) exceed twenty, all the volume of overdraft protections purchased is priced at $3.00 each. Likewise, if the combined volume of overdraft protections purchased by the group of accounts in the pricing relationship exceed fifty or one hundred, all the volume of overdraft protections purchased is priced at $2.00 each or $1.00 each, respectively. Otherwise, the first twenty overdraft protections are priced at $4.00 each.

At step 104, the FSC receives a request for a real-time price quote for a financial transaction from a customer. Typically, the customer establishes one or more accounts with the FSC, and specifies a particular account in requesting the real-time quote for the financial transaction. In particular, the financial transaction data and the request for the real-time price quote is input into, and received by the data processing system. Continuing the wire transfer example, Company ABC, using Account A, may request a real-time price quote for a wire transfer. The request may have been submitted during a billing cycle, for example, the tenth day of the month.

At step 106, the data processing system performs transaction analysis on the financial transaction to determine the associated production services. In the above example, the data processing system determines that the wire transfer maps to, and is associated with the debit from account, credit to account, and overdraft protection production services.

At step 108, the data processing system determines if there is a production service to process or if it has processed all the production services. If there is a production service to process, the data processing system identifies the production service and determines the appropriate billable services associated with the identified production service at step 110. A production service may map to one or more billable services. Continuing the above example, the data processing system may start by processing the overdraft protection production service (step 108). The data processing system then determines that the overdraft protection service maps to a single billable service (step 110).

At step 112, the data processing system determines if there is a billable service to process. If all the billable services for the production service have been processed, the data processing system returns to step 108 to process the next production service. If there is a billable service to process, the data processing system identifies the billable service and determines the billing entity (i.e., billable entity) for the billable service at step 114. Continuing the above example, the data processing system determines that for the overdraft protection service, it has to process the associated billable service (step 112) and that the billing entity includes Accounts A, B, C, and D (step 114).

At step 116, the data processing system determines if there is a pricing relationship established for the billable service. Continuing the above example, the data processing system determines that a pricing relationship exists between Accounts A, B, and C for the overdraft protection service. Thus, for the billable service associated with the overdraft protection service requested by Account A, an applicable pricing relationship exists.

At step 118, the data processing system determines the total count of the billable service consumed or purchased by the accounts in the pricing relationship. The data processing system maintains a record of the number of the number of billable service instances purchased by the accounts in the pricing relationship. Continuing the above example, the data processing system determines the number of billable service instances purchased by Accounts A, B, and C up to this point (i.e., tenth day) in the current billing cycle. For example, in this current billing cycle, a total of fifty overdraft protections may have been purchased (none by Account A, twenty by Account B, and thirty by Account C). Thus, the current overdraft protection would be the fifty-first purchased in the current billing cycle.

At step 120, the data processing system calculates a price for the billable service from an associated price table based on the total number of billable service instances. The data processing system applies any applicable volume discount resulting from the billable service instances purchased by the accounts in the pricing relationship. Continuing the above example, the data processing system determines from the price table for the billable service associated with the overdraft protection service that the fifty-first overdraft protection instance purchased results in all the overdraft protection instances purchased by the group of accounts in the pricing relationship to be priced at $2.00 each. Thus, fifty-one overdraft protection instances is priced at a total price of $102.00.

At step 122, the data processing system apportions the portion of the total price for the billable service instances to the current billable service being processed. Continuing the above example, the data processing system apportions a price of $2.00 ($\frac{1}{51}$ of the total price of $102.00) to the current billable service associated with the overdraft protection. Thus, the current billable service associated with the overdraft protection is priced at $2.00. Thus, Account A benefits from the billable service instances purchased by Accounts B and C. Company ABC (Account A) receives a volume discount as a result of purchases made by Company XYZ (Account C). The data processing system then returns to step 112 to continue processing the next billable service associated with the overdraft protection service.

The data processing system processes the other production services (i.e., debit from account and credit to account) associated with the financial transaction (i.e., wire transfer) in the manner described above. If, at step 108, all the production services for the financial transaction have been processed, the data processing system calculates the real-time price quote for the requested financial transaction at step 124. The financial transaction price is determined by summing the prices of the associated billable services. The data processing system provides the real-time price quote and ends at step 126.

Those of ordinary skill in the art will appreciate that, for this and other methods disclosed herein, the functions performed in the exemplary flow charts may be implemented in differing order. Furthermore, steps outlined in the flow charts are only exemplary, and some of the steps may be optional, combined into fewer steps, or expanded into additional steps without detracting from the essence of the invention.

Method for Calculating a Variance to a Real-Time Price

In one embodiment, the data processing system recalculates the price for the financial transactions and the associated billable services at the end of the billing cycle to account for and accommodate changes that occurred during a billing cycle. The recalculation may result in a variance to the real-time price quoted and charged for a financial transaction to an account during the billing cycle. A variance to the price may result from reasons such as, by way of example, a change to a billing entity resulting in a change in applicable price table(s), a change to an allocation of an account to different departments or market segments resulting in a change in applicable price table(s), a new price becoming effective during a billing cycle, a change in a pricing relationship, additional financial transactions purchased during a billing cycle, and the like. The data processing system may report the variances between the real-time price and the end-of-billing cycle price to the FSC, for example, as either discounts or adjustments.

FIG. 2 illustrates a flow chart of an exemplary method 200 for calculating a variance to a real-time price with volume discounting. Beginning at a start step 202, the data processing system identifies the financial transactions that occurred during the prior billing cycle. The data processing system may perform a transaction analysis for each financial transaction and determine the associated production services and billable services.

At step 204, the data processing system performs an end-of-billing cycle pricing for each billable service instance that occurred during the just ended billing cycle. In particular, the data processing system, for each billable service instance, determines the account that purchased the billable service instance. The data processing system identifies any applicable pricing relationships for the account. For example, there may have been a change in the pricing relationship. Continuing the above wire transfer example, the pricing relationship may have been changed during the billing cycle to include Account D, and Account D may have purchased forty overdraft protections during the billing cycle.

The data processing system determines an end-of-billing cycle count of the total number of billable service instances purchased by the accounts during the recently ended billing cycle. Continuing the above wire transfer example, between the tenth day of the billing cycle and the end of the billing cycle, Account A may have purchased an additional nine-teen overdraft protection services, for a total of twenty, at a price of $2.00 each. Thus, the accounts in the pricing relationship at the end of the billing cycle (Accounts A, B, C, and D) purchased a total of one hundred and ten overdraft protection services (twenty by Account A, twenty by Account B, thirty by Account C, and forty by Account D).

At step 206, the data processing system calculates an end-of-billing cycle price for the billable service instances purchased during the billing cycle from the associated price table based on the end-of-billing cycle count. Continuing the above example, the data processing system determines from the price table that at a volume of one hundred and ten overdraft protection services, all the overdraft protection instances purchased by the accounts in the pricing relationship should be charged $1.00 each. Thus, the one hundred and ten overdraft protection instances is priced at a total of $110.00.

At step 208, the data processing system modifies the price apportioned to the billable service based on the end-of-billing cycle price. The data processing system calculates the variance between the real-time price quoted and charged for each billable service instance and the end-of-billing cycle price for the billable service instance. Continuing the above example, the data processing system determines that Account A was charged a total price of $40.00 ($2.00 for each overdraft protection service) for the twenty overdraft protection service instances purchased during the billing cycle. The data processing system calculates the end-of-billing cycle price for the twenty overdraft protection service instances purchased by Account A to be $20.00 ($1.00 for each overdraft protection service). Thus, there is a variance of $20.00 for the twenty overdraft protections service instances purchased by Account A.

The data processing system calculates the variance for the remaining billable services and ends at step 210. In one embodiment, the data processing system generates a report to the FSC to report the end-of-billing cycle pricing. The report may include the calculated variances for each billable service, financial transaction, account, billing entity, etc. Thus, the data processing system efficiently adjusts to and incorporated changes to the billing parameters that occur during a billing cycle.

In one embodiment, a price variance may result from a change to an allocation of an account to a different department or market segment. This may result in a change to one or more applicable price tables for a billable service. The change the applicable price tables may affect the volume discount calculation and any applicable exception pricing calculation. Implementation of exception pricing is described in U.S. Pat. No. 6,052,672.

As described herein, the present invention in at least one embodiment facilitates a real-time pricing of a financial transaction during a billing cycle that accounts for applicable volume discounts. One embodiment of the present invention provides a data processing system that receives and processes a request to provide a real-time price quote for a financial transaction. The data processing system maintains a record of the billable service instances purchased during the billing cycle, and is able to account for applicable volume discounts in calculating a real-time price quote for the financial transaction at any instance in time during the billing cycle.

In at least one embodiment, the data processing system maintains a record of one or more pricing relationships. A pricing relationship may include one or more accounts, one or more services, or a combination or one or more accounts and services. The data processing system maintains a record of the billable service instances purchased by the accounts in an applicable pricing relationship, and is able to account for the applicable volume discounts resulting from the pricing relationship in calculating a real-time price quote for the financial transaction during the billing cycle.

In at least one embodiment, the data processing system performs an end-of-billing period price calculation to identify variances to the real-time price quotes generated during the billing cycle. The calculated variances are reported to the FSC as discounts or adjustments to the price of the financial transactions. The data processing system permits changes to be made during a billing cycle, and the changes are reflected in the previously calculated and quoted real-time prices.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. A computer-implemented method for charging a billable entity for transactions against financial instruments during a billing cycle, where the billable entity comprises related portfolios and where each portfolio is associated with one or more of the financial instruments, said method comprising the following steps performed in a data processing system:

for each transaction to be charged, at the time the transaction takes place:
identifying a first set of transactions, being all transactions executed for the billable entity during the billing cycle up to and including the transaction to be charged;
identifying for the transaction to be charged one or more production services, wherein one or more instances of each identified production service are components of the transaction to be charged; and
for each identified production service:
determining a quantity or count of the identified production service in the transaction to be charged;
determining a running total quantity or count of the identified production service for the first set of transactions;
determining a first total charge for the identified production service, said first total charge being applicable to the running total quantity or count of the identified production service, according to a pricing method applicable to the identified production service or the billable entity at the time of the transaction to be charged; and
determining a tentative charge for the identified production service of the transaction to be charged by multiplying the first total charge by the ratio of (i) the quantity or count of the identified production service in the transaction to be charged to (ii) the running total quantity or count of the identified production service; and
at the end of the billing cycle, for each production service in the billing cycle, calculating an end-of-period variance or correction to the tentative charge, the end-of-period variance or correction being calculated using a method comprising:
identifying a final set of transactions, being all transactions executed for the billable entity during the billing cycle;
determining an end-of-period total quantity or count for each production service associated with the final set of transactions; and
determining a final total charge applicable to the billable entity's end-of-period total quantity or count for each production service; and
determining an end-of-period apportionment charge for each production service for each transaction in the final set of transactions by multiplying the final total charge by the ratio of (i) the quantity or count of the production service for the transaction, to (ii) the end-of-period total quantity or count of the production service;
for each production service for each transaction:
calculating the end-of-period variance or correction by determining a difference between the end-of-period production service apportionment charge and the tentative charge; and
modifying the tentative charge of each production service of each transaction using the corresponding end-of-period variance or correction.

2. The method of claim 1, further comprising notifying one or more responsible persons related to the billable entity of the end-of-period variances or corrections using a form of mass media.

3. The method of claim 1, wherein the billable entity contains (i) a first portfolio entity associated with one or more financial instruments traded and transacted through a first computerized exchange network, and (ii) a second portfolio entity associated with one or more financial instruments traded and transacted through a second computerized exchange network.

4. The method of claim 1, wherein each production service relates to one or more of the following actions or activities: (a) buying, (b) selling, (c) notifying a customer, (d) notifying a broker, (e) notifying an exchange, (f) exercising an option, (g) splitting, (h) renewing a term, (i) liquidating, (j) generating a risk scenario, (k) performing a valuation, (k) a margin call, (l) transferring assets, and (m) transferring funds.

5. The method of claim 1, wherein one or more transactions comprise an action which results in a change of ownership of a financial instrument.

6. The method of claim 1, wherein one or more transactions comprise an action which does not result in the change of ownership of a financial instrument.

7. The method of claim 1, wherein each quantity or count comprises a value pertaining to production services consisting of one or more of: an instance count, an occurrence count, a decimalized number, a monetary amount, a percentage, a ratio, an average, a dimension, a volume, a weight, a height, a width, a depth, a distance, and a series or set of values.

8. The method of claim 1, wherein the related portfolios of the billable entity change during or at end of the billing cycle.

9. The method of claim 1, wherein the pricing method changes during or at end of the billing cycle.

10. The method of claim 1, wherein the pricing method is based on one or more of (i) a calculation formula, and (ii) individual factor/variable values to be substituted into a calculation formula.

11. The method of claim 1, wherein each pricing method is associated with one or more of the following generic descriptors: (a) unit price, (b) unit cost, (c) flat fee, (d) minimum revenue, (e) tiering (f) volume discount, and (g) cost plus markup.

12. A non-transitory computer-readable storage device provided for carrying out a method for carrying out in a data processing system a method for charging a billable entity for transactions against financial instruments during a billing cycle, where the billable entity comprises related portfolios and where each portfolio is associated with one or more of the financial instruments, the computer-readable storage device comprising computer-executable instructions for:

for each transaction to be charged, at the time the transaction takes place:
identifying a first set of transactions, being all transactions executed for the billable entity during the billing cycle up to and including the transaction to be charged;
identifying for the transaction to be charged one or more production services, wherein one or more instances of each identified production service are components of the transaction to be charged; and
for each identified production service:
determining a quantity or count of the identified production service in the transaction to be charged;
determining a running total quantity or count of the identified production service for the first set of transactions;
determining a first total charge for the identified production service, said first total charge being applicable to the running total quantity or count of the identified production service, according to a pricing method applicable to the identified production service or the billable entity at the time of the transaction to be charged; and
determining a tentative charge for the identified production service of the transaction to be charged by multiplying the first total charge by the ratio of (i) the quantity or count of the identified production service in the transaction to be charged to (ii) the running total quantity or count of the identified production service; and
at the end of the billing cycle, for each production service in the billing cycle, calculating an end-of-period variance or correction to the tentative charge, the end-of-period variance or correction being calculated using a method comprising:
identifying a final set of transactions, being all transactions executed for the billable entity during the billing cycle;
determining an end-of-period total quantity or count for each production service associated with the final set of transactions; and
determining a final total charge applicable to the billable entity's end-of-period total quantity or count for each production service; and
determining an end-of-period apportionment charge for each production service for each transaction in the final set of transactions by multiplying the final total charge by the ratio of (i) the quantity or count of the production service for the transaction, to (ii) the end-of-period total quantity or count of the production service;
for each production service for each transaction:
calculating the end-of-period variance or correction by determining a difference between the end-of-period production service apportionment charge and the tentative charge; and
modifying the tentative charge of each production service of each transaction using the corresponding end-of-period variance or correction.

13. The computer-readable storage device of claim 12, further comprising computer-executable instructions for notifying one or more responsible persons related to the billable entity of the end-of-period variances or corrections using a form of mass media.

14. The computer-readable storage device of claim 12, wherein the billable entity contains (i) a first portfolio entity associated with one or more financial instruments traded and transacted through a first computerized exchange network, and (ii) a second portfolio entity associated with one or more financial instruments traded and transacted through a second computerized exchange network.

15. The computer-readable storage device of claim 12, wherein each production service relates to one or more of the following actions or activities: (a) buying, (b) selling, (c) notifying a customer, (d) notifying a broker, (e) notifying an exchange, (f) exercising an option, (g) splitting, (h) renewing a term, (i) liquidating, (j) generating a risk scenario, (k) performing a valuation, (k) a margin call, (l) transferring assets, and (m) transferring funds.

16. The computer-readable storage device of claim 12, wherein one or more transactions comprise an action which results in a change of ownership of a financial instrument.

17. The computer-readable storage device of claim 12, wherein one or more transactions comprise an action which does not result in the change of ownership of a financial instrument.

18. The computer-readable storage device of claim 12, wherein each quantity or count comprises a value pertaining to production services consisting of one or more of: an instance count, an occurrence count, a decimalized number, a monetary amount, a percentage, a ratio, an average, a dimension, a volume, a weight, a height, a width, a depth, a distance, and a series or set of values.

19. The computer-readable storage device of claim 12, wherein the related portfolios of the billable entity change during or at end of the billing cycle.

20. The computer-readable storage device of claim 12, wherein the pricing method changes during or at end of the billing cycle.

21. The computer-readable storage device of claim 12, wherein the pricing method is based on one or more of (i) a calculation formula, and (ii) individual factor/variable values to be substituted into a calculation formula.

22. The computer-readable storage device of claim 12, wherein each pricing method is associated with one or more of the following generic descriptors: (a) unit price, (b) unit cost, (c) flat fee, (d) minimum revenue, (e) tiering (f) volume discount, and (g) cost plus markup.

* * * * *